(12) United States Patent
Suzuki et al.

(10) Patent No.: US 8,098,329 B2
(45) Date of Patent: Jan. 17, 2012

(54) IMAGE DETERMINATION APPARATUS, IMAGE DETERMINATION METHOD, AND PROGRAM, AND IMAGE PROCESSING APPARATUS, IMAGE PROCESSING METHOD, AND PROGRAM

(75) Inventors: Masaru Suzuki, Tokyo (JP); Masami Ogata, Kanagawa (JP); Kazuhiko Ueda, Kanagawa (JP)

(73) Assignee: Sony Corporation, Tokyo (JP)

( * ) Notice: Subject to any disclaimer, the term of this patent is extended or adjusted under 35 U.S.C. 154(b) by 1084 days.

(21) Appl. No.: 11/846,451

(22) Filed: Aug. 28, 2007

(65) Prior Publication Data

US 2008/0174699 A1    Jul. 24, 2008

(30) Foreign Application Priority Data

Aug. 29, 2006  (JP) ............................... P2006-232556
Aug. 29, 2006  (JP) ............................... P2006-232570

(51) Int. Cl.
*H04N 5/46* (2006.01)
*H04N 5/21* (2006.01)

(52) U.S. Cl. ...................................... 348/558; 348/607

(58) Field of Classification Search .................. 348/554, 348/558, 556, 607, 624, 625, 630, 708, 571, 348/441, 445, 458, 459; 382/254, 272, 275; *H04N 3/27, 5/46, 5/21, 9/64, 7/01, 11/20*
See application file for complete search history.

(56) References Cited

U.S. PATENT DOCUMENTS 7,031,551 B2 *  4/2006  Yano et al. .................... 348/607
7,403,235 B2 *  7/2008  Nakaya et al. ................ 348/441

FOREIGN PATENT DOCUMENTS

| JP | 2003-101774 | 4/2003 |
|----|-------------|--------|
| JP | 2003-153284 | 5/2003 |
| JP | 2003-244481 | 8/2003 |
| JP | 2004-056350 | 2/2004 |
| JP | 2005-26814  | 1/2005 |
| JP | 2005-65195  | 3/2005 |

OTHER PUBLICATIONS

English-language translation of JP 2003-101774.
English-language translationof JP 2003-153284.
English-language translationof JP 2003-244481.
English-language translationof JP 2004-56350.
Japanese Office Action for JP 2006-232570.

* cited by examiner

*Primary Examiner* — Sherrie Hsia
(74) *Attorney, Agent, or Firm* — Finnegan, Henderson, Farabow, Garrett & Dunner, L.L.P.

(57) ABSTRACT

An image determination apparatus includes a frequency band signal detecting unit, an average value calculating unit, a relative value calculating unit, and an image determination unit. The frequency band signal detecting unit detects signals belonging to a plurality of frequency bands, from an image signal. The average value calculating unit calculates average values for respective ones of the signals belonging to the plurality of frequency bands detected by the frequency band signal detecting unit. Each of the average values is a characteristic value equivalent to an amplitude. The relative value calculating unit calculates a relative value of one of the average values to another of the average values, among the average values calculated for respective ones of the plurality of frequency bands. The image determination unit for determining an image based on the relative value calculated by the relative value calculating unit. The image determined is subject to image-processing.

20 Claims, 16 Drawing Sheets

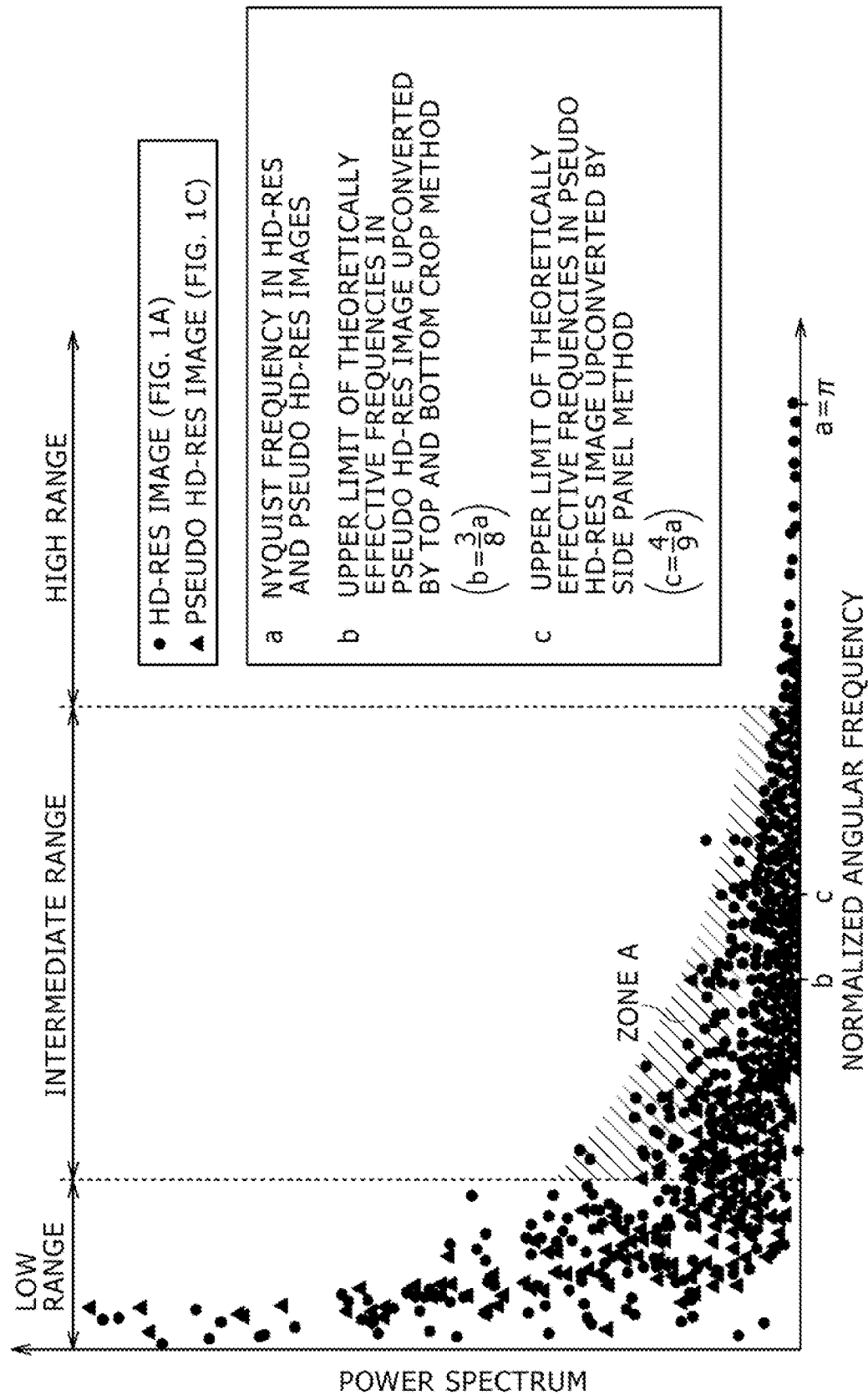

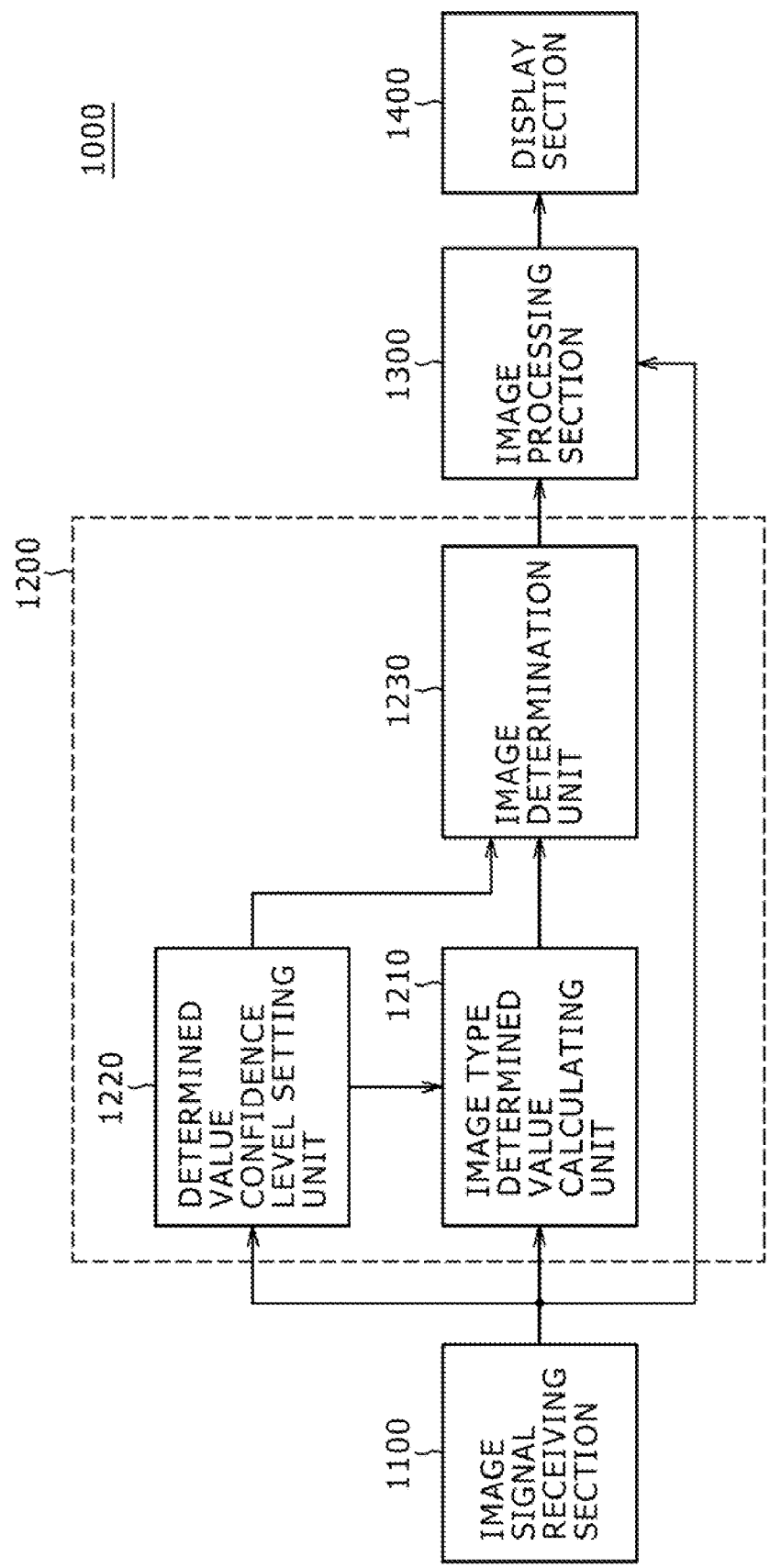

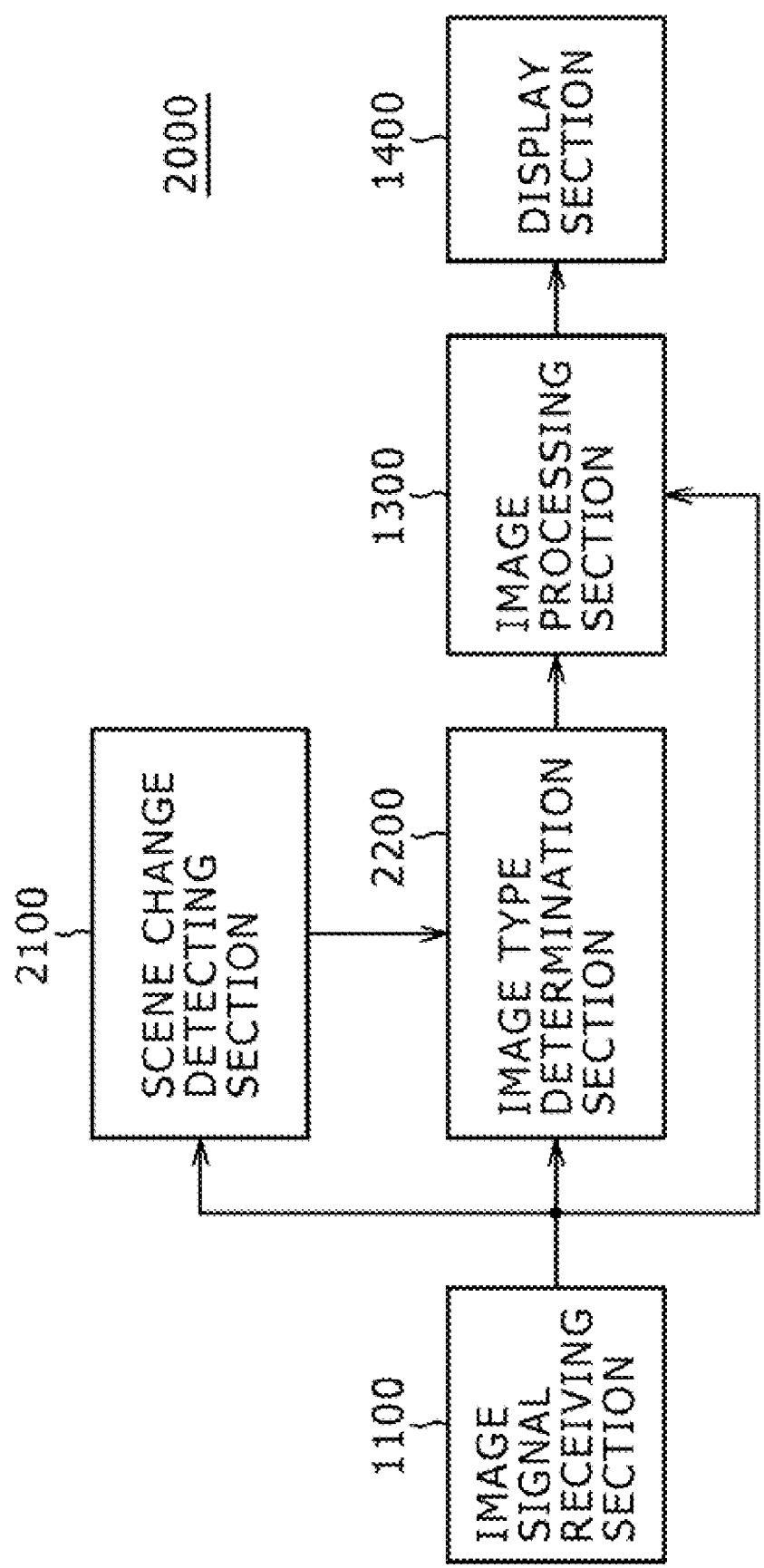

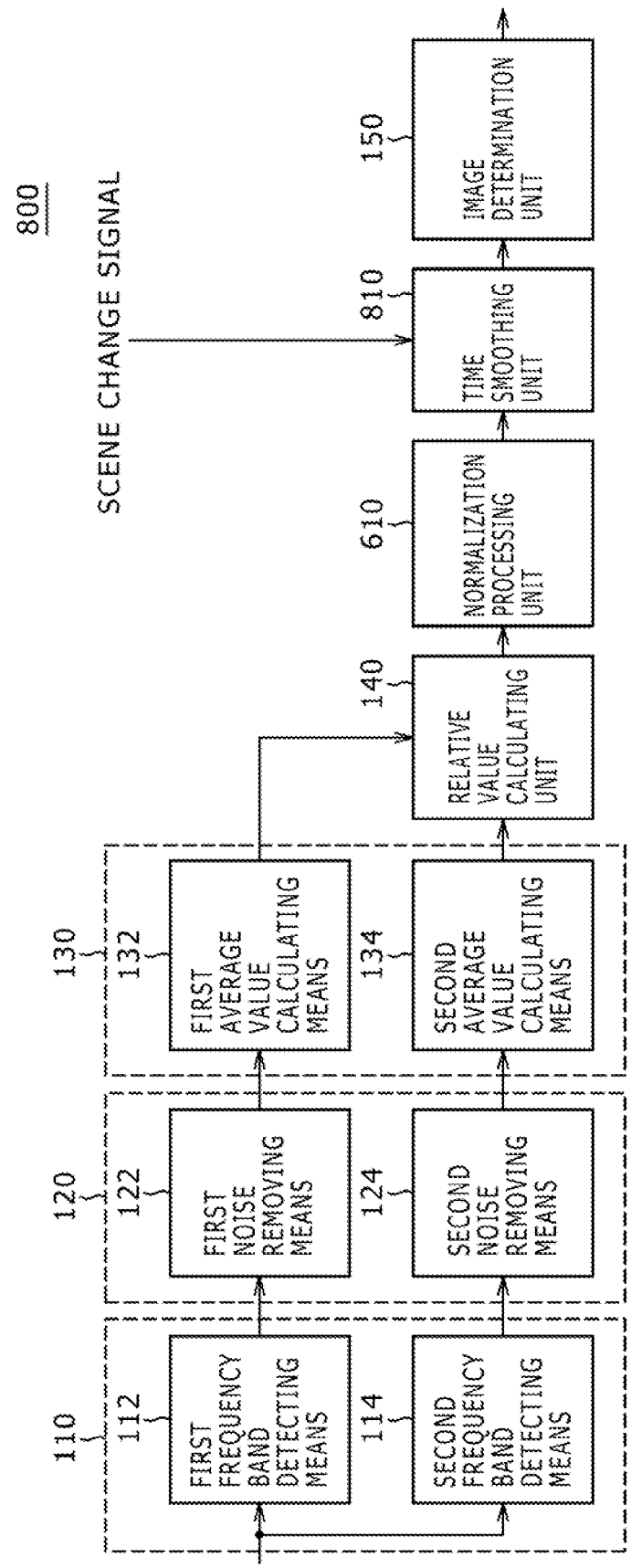

IMAGE DETERMINATION APPARATUS, IMAGE DETERMINATION METHOD, AND PROGRAM, AND IMAGE PROCESSING APPARATUS, IMAGE PROCESSING METHOD, AND PROGRAM

BACKGROUND OF THE INVENTION

1. Field of the Invention

The present invention relates to an image determination apparatus, an image determination method, and a program for causing a computer to execute the image determination, and an image processing apparatus, an image processing method, and a program for causing a computer to execute the image processing.

2. Description of Related Art

Recently, along with the start of digital broadcasting, high-definition resolution (HD-resolution) image signals are transmitted from broadcasting stations or the like. However, image signals transmitted from the broadcasting stations or the like are not all HD-resolution image signals, but may in some cases contain pseudo HD-resolution image signals which are upconverted from the standard-definition resolution (SD-resolution) image signals used in the traditional analog broadcasting, into HD-resolution image signals.

For upconverting an SD-resolution image into an HD-resolution image, a side panel method, a top and bottom crop method, a stretch method, and the like are known.

Generally, a pseudo HD-resolution image upconverted from an SD-resolution image into an HD-resolution image is inferior in image quality to a pure HD-resolution image, and thus needs to enhance its outline by using, e.g., an image enhancer or the like.

Meanwhile, technologies are under development for determining whether or not an image signal represents an image obtained upconverted from an SD-resolution image into an HD-resolution image.

For example, Japanese Unexamined Patent Application Publication No. 2005-65195 discloses an image determination technology by detection of side panels. Furthermore, e.g., Japanese Unexamined Patent Application Publication No. 2005-26814 discloses another image determination technology that involves calculation of an average brightness in addition to detection of side panels.

SUMMARY OF THE INVENTION

However, the above-mentioned image determination technology by detection of side panels requires that side panel signals representing ineffective areas be only signals below a predetermined threshold. Therefore, with this image determination technology by detection of side panels, it is difficult to determine the image unless the side panel signals added to an image upconverted from an SD-resolution image into an HD-resolution image are signals below a predetermined threshold.

Meanwhile, in addition to the side panel method, there is a method of upconverting SD-resolution image into an HD-resolution image by the top and bottom crop method, the stretch method, and the like that involve no side panels as ineffective areas. Therefore, the above-mentioned image determination technology by detection of side panels is incapable of determination an image when the image signal contains no side panel signals.

Furthermore, the above-mentioned image determination technology involving calculation of an average brightness in addition to detection of side panels is also based on detection of side panels, and hence may neither determine nor process an image when the image signal contains no side panel signals.

Therefore, the developing technologies for determining whether or not an image is upconverted from an SD-resolution image into an HD-resolution image may determine and process the image only under certain conditions.

Accordingly, it is desirable to provide an image determination apparatus, an image determination method, and a program, and an image processing apparatus, an image processing method, and a program, all of which are novel and improved, and capable of determining an image independently of any method by which the image is upconverted.

In accordance with a first aspect of the present invention, there is provided an image determination apparatus including a frequency band signal detecting unit, an average value calculating unit, a relative value calculating unit, and an image determination unit. The frequency band signal detecting unit detects signals belonging to a plurality of frequency bands, from an image signal. The average value calculating unit calculates average values, each of which is a characteristic value equivalent to an amplitude, for respective ones of the signals belonging to the plurality of frequency bands detected by the frequency band signal detecting unit. The relative value calculating unit calculates a relative value of one of the average values to another of the average values, among the average values calculated for respective ones of the plurality of frequency bands. The image determination unit determines an image based on the relative value calculated by the relative value calculating unit.

The frequency band signal detecting unit detects signals belonging to a plurality of frequency bands from an image signal, e.g., by filtering the image signal every pixel. The signals belonging to the plurality of frequency bands may be signals belonging to frequency bands each having predetermined upper and lower limits, or signals belonging to frequency bands each having no upper limit but being not less than a predetermined lower limit.

The average value calculating unit calculates the average values of the characteristic values equivalent to the amplitudes, for respective ones of the signals belonging to the plurality of frequency bands detected every pixel by the frequency band signal detecting unit. The average values calculated by the average value calculating unit may be obtained, e.g., by arithmetic mean of absolute characteristic values (average value) equivalent to the amplitudes, for respective ones of the signals belonging to the plurality of frequency bands.

The relative value calculating unit calculates the relative value of one of the average values to another of the average values, among the average values calculated for respective ones of the plurality of frequency bands. A lower limit of frequencies in a frequency band deriving such another average value is set to, e.g., a value lower than a lower limit of frequencies in a frequency band deriving such one average value.

The image determination unit determines the image based on the relative value calculated by the relative value calculating unit. The image determination may be performed to uniquely determine whether the image is an HD-resolution image or is upconverted from an SD-resolution image, e.g., by comparing the relative value with a predetermined threshold, or by using the relative value itself as an index for defining how probable it is that the image will be an HD-resolution image.

As a result of this configuration, an image may be determined independently of any method by which the image is upconverted.

Furthermore, the image determination apparatus may further include a noise removing unit that removes signals indicating the characteristic values being less than a predetermined threshold, for respective ones of the signals belonging to the plurality of frequency bands detected by the frequency band signal detecting unit. The average value calculating unit may also calculate the average values of the characteristic values from which noise is removed by the noise removing unit.

The noise removing unit may perform noise removal for respective ones of the signals belonging to the plurality of frequency bands detected every pixel by the frequency band signal detecting unit. The noise removal may be performed, e.g., by removing signals indicating the characteristic values being less than a predetermined threshold. Furthermore, the average value calculating unit may calculate the average values of the characteristic values from which noise is removed by the noise removing unit. By being provided with the noise removing unit, the image determination apparatus may remove noise, i.e., any abnormal value, and thus performs more accurate image determination.

The image determination apparatus may also include a sample size confidence level setting unit, an average value confidence level setting unit, and a confidence level setting unit. The sample size confidence level setting unit sets first confidence levels for sample sizes of the characteristic values, for respective ones of the signals belonging to the plurality of frequency bands detected by the frequency band signal detecting unit. The average value confidence level setting unit sets a second confidence level for at least one of the average values for the respective ones of the signals belonging to the plurality of frequency bands calculated by the average value calculating unit. The confidence level setting unit sets a third confidence level for the relative value based on the first confidence levels and the second confidence level. The image determination unit may also determine the image further based on the third confidence level.

The sample size confidence level setting unit may set the first confidence levels for the sample sizes of the characteristic values for respective ones of the signals belonging to the plurality of frequency bands. The average value confidence level setting unit may set the second confidence levels for the average values for respective ones of the signals belonging to the plurality of frequency bands. The confidence level setting unit may set the third confidence level for the relative value calculated by the relative value calculating unit based on the first confidence levels and the second confidence levels. Then, the image determination unit may determine the image based on the relative value calculated by the relative value calculating unit, and the third confidence level. As a result of this configuration, the image determination apparatus may determine the image independently of any method by which the image is upconverted, and also after eliminating factors responsible for decreasing the confidence levels of determination results on the image.

The image determination unit may also determine the image based on the relative value calculated by the relative value calculating unit if the third confidence level is not less than a predetermined threshold.

With this configuration, an image may be determined independently of any method by which the image is upconverted, and also, after eliminating factors responsible for decreasing the confidence levels of determination results on the image.

The image determination unit may record a relative value used for image determination, and determine the image based on the recorded relative value if the third confidence level is less than a predetermined threshold.

As a result of this configuration, prevent erroneous determination may be prevented in the image determination using an input image signal.

Furthermore, the relative value calculating unit may calculate the relative value based on the average value calculated with a preset predetermined frequency band and the average value calculated with a frequency band higher than the preset predetermined frequency band.

The relative value calculating unit may calculate the relative value of the average value calculated with the frequency band higher than the preset predetermined frequency band, to the average value calculated with the preset predetermined frequency band. Therefore, from the relative value calculating unit, one relative value is outputted. The image determination apparatus may perform image determination by using the one relative value. As a result of this configuration, an image may be determined independently of any method by which the image is upconverted.

Furthermore, a lower limit frequency of the preset predetermined frequency band may be lower than an upper limit of theoretically effective frequencies pursuant to upconverting method with respect to a Nyquist frequency of an image upconverted from a standard-resolution image, and a lower limit frequency of the higher frequency band may be higher than the upper limit of theoretically effective frequencies pursuant to upconverting method with respect to the Nyquist frequency of the image upconverted from the standard-resolution image.

Typical images have frequency-amplitude characteristics in which their amplitude is large in the low frequency band and attenuates as the frequency increases. Therefore, by setting an upper limit of theoretically effective frequencies with respect to a Nyquist frequency of an image upconverted from a standard-resolution (SD-resolution) image as a reference, a relative value more suitable for image determination may be calculated. The Nyquist frequency of the image obtained by upconverting the SD-resolution image is uniquely defined according to a sampling frequency (Nyquist frequency=sampling frequency$\times(\frac{1}{2})$), and the upper limit of theoretically effective frequencies with respect to the Nyquist frequency is uniquely defined according to an upconverting method. Therefore, the image determination apparatus may set the lower limit frequency of the preset predetermined frequency band, e.g., as mentioned above. As a result of this configuration, an image may be determined independently of any method by which the image is upconverted.

The relative value calculating unit may calculate a plurality of the relative values based on the average value calculated with a preset predetermined frequency band and the average value calculated with a plurality of frequency bands higher than the preset predetermined frequency band.

The relative value calculating unit may calculate relative values, for respective ones of the plurality of frequency bands, each relative value being calculated as a relative value of the average value calculated with each of a plurality of frequency bands higher than a preset predetermined frequency band to the average value calculated with the preset predetermined frequency band. Therefore, a plurality of relative values may be outputted from the relative value calculating unit. The image determination apparatus may perform image determination by using the plurality of relative values. The image determination apparatus may perform image determination either based on one of the plurality of relative values, or based on the plurality of relative values. As a result of this configuration, an image may be determined independently of any method by which the image is upconverted.

The relative value calculating unit may calculate a plurality of the relative values based on the average values calculated with a plurality of preset predetermined frequency bands and the average value calculated with a frequency band higher than each of the plurality of preset predetermined frequency bands.

The relative value calculating unit may preset a plurality of predetermined frequency bands, and calculate the relative values for respective ones of the plurality of predetermined frequency bands, each relative value being calculated as a relative value of the average value calculated with a frequency band higher than each of the plurality of predetermined frequency bands to each of the average values calculated with the plurality of predetermined frequency bands. Therefore, a plurality of relative values may be outputted from the relative value calculating unit, in each of which a reference frequency band for calculating the relative value is different. The image determination apparatus may perform image determination by using the plurality of relative values. The image determination apparatus may perform image determination either based on one of the plurality of relative values, or based on the plurality of relative values. As a result of this configuration, an image may be determined independently of any method by which the image is upconverted.

The average value calculating unit may calculate the average value in each of the plurality of frequency bands, for each of local areas in the whole of an image, and the image determination unit determines the image for each of the local areas based on the relative value.

The average value calculating unit may calculate the average value in each of the plurality of frequency bands, for each of local areas in the whole of an image. Furthermore, the image determination unit may perform image determination based on the relative value calculated by using the average values calculated for each of the local areas. As a result of this configuration, the image determination apparatus may perform image determination on each of the local areas in the whole of the image, even if an HD-resolution image portion and an image portion upconverted from an SD-resolution image are mixed in an image for determination, and thus may perform image determination accurately.

In accordance with a second aspect of the present invention, there is provided an image determination method that includes the steps of detecting signals belonging to a plurality of frequency bands from an image signal, calculating average values, each of which is a characteristic value equivalent to an amplitude, for respective ones of the detected signals belonging to the plurality of frequency bands, calculating a relative value of one of the average values to another of the average values, among the average values calculated for respective ones of the plurality of frequency bands, and determining an image based on the calculated relative value.

By using this method, whether an image is an HD-resolution image or a pseudo HD-resolution upconverted from an SD-resolution image may be determined.

In accordance with a third aspect of the present invention, there is provided a program for causing a computer to execute the steps of detecting signals belonging to a plurality of frequency bands from an image signal, calculating average values, each of which is a characteristic value equivalent to an amplitude, for respective ones of the signals belonging to the plurality of frequency bands detected in the detecting step, calculating a relative value of one of the average values to another of the average values, among the average values calculated for respective ones of the plurality of frequency bands, and determining an image based on the relative value calculated in the relative value calculating step.

With this program, an image may be determined independently of any method by which the image is upconverted.

In accordance with the first to third aspects of the present invention, an image may be determined independently of any method by which the image is upconverted.

In accordance with a fourth aspect of the present invention, there is provided an image processing apparatus that includes an image type determination section and an image processing section. The image type determination unit includes a frequency band signal detecting unit, an average value calculating unit, a relative value calculating unit, and an image determination unit. The frequency band signal detecting unit detects signals belonging to a plurality of frequency bands, from an image signal. The average value calculating unit calculates average values, each of which is a characteristic value equivalent to an amplitude, for respective ones of the signals belonging to the plurality of frequency bands detected by the frequency band signal detecting unit. The relative value calculating unit calculates a relative value of one of the average values to another of the average values, among the average values calculated for respective ones of the plurality of frequency bands. The image determination unit determines an image based on the relative value calculated by the relative value calculating unit. The image processing unit processes the image based on a determination result on the image from the image type determination unit.

The image processing section processes the image based on the image determination result by the image type determination unit. The image processing in the image processing section may include processing for enhancing the outline of the image based on the image type determination unit determination whether or not the image upconverted from an SD-resolution image, or the content of the processing may be suitably changed based on the relative value as an index indicating how probable it is that the image will be an HD-resolution image.

The image type determination unit may further include a noise removing unit that removes signals indicating the characteristic values being less than a predetermined threshold, for respective ones of the signals belonging to the plurality of frequency bands detected by the frequency band signal detecting unit. The average value calculating unit may calculate the average values of the characteristic values from which noise is removed by the noise removing unit.

The noise removing unit and the relative value calculating unit may be configured similarly to the above-mentioned image determination apparatus.

The image type determination unit may further include a time smoothing unit that time-smooths the relative value, and the image determination unit may determine the image based on the time-smoothed relative value.

The image type determination unit may further include a time smoothing unit to perform time-smoothing of the relative value. The image determination unit determines the image based on the time-smoothed relative value. Therefore, e.g., when relative values fluctuate largely for some reason, despite the fact that there is no change in the scene of the image, the image type determination section may minimizes the fluctuation of the relative values, and thus may perform image determination with variations of image determination results for the same scene suppressed.

In accordance with a fifth aspect of the present invention, there is provided an image processing method that includes the steps of detecting signals belonging to a plurality of frequency bands from an image signal, calculating average values, each of which is a characteristic value equivalent to an amplitude, for respective ones of the detected signals belonging to the plurality of frequency bands, calculating a relative value of one of the average values to another of the average values, among the average values calculated for respective ones of the plurality of frequency bands, determining an image based on the calculated relative value, and processing the image based on a determination result on the image.

In accordance with a sixth aspect of the present invention, there is provided a program for causing a computer to execute the steps of detecting signals belonging to a plurality of frequency bands from an image signal, calculating average values, each of which is a characteristic value equivalent to an amplitude, for respective ones of the signals belonging to the plurality of frequency bands detected in the detecting step, calculating a relative value of one of the average values to another of the average values, among the average values calculated for respective ones of the plurality of frequency bands, determining an image based on the relative value calculated in the relative value calculating step, and processing the image based on the determination result.

In accordance with the fourth to sixth aspects of the present invention, it is enabled to determine an image independently of any method by which the image is upconverted, and process the image based on the determination result.

BRIEF DESCRIPTION OF THE DRAWINGS

FIG. 2 is a diagram illustrating frequency-amplitude characteristic differences between the HD-resolution image shown in FIG. 1A and a pseudo HD-resolution image shown in FIG. 1C;

FIG. 14 is a diagram illustrating a display unit to which the image determination apparatuses according to embodiments of the present invention are applied;

FIG. 15 is a diagram illustrating an image processing apparatus according to an embodiment of the present invention; and FIG. 16 is a diagram illustrating an image type determination unit according to an eighth embodiment of the image type determination unit.

DETAILED DESCRIPTION OF THE EMBODIMENTS

Referring to the accompanying drawings, embodiments of the present invention will now be described in detail. In the present specification and the drawings, components having substantially the same functions and configurations are given the same reference symbols, whereby duplicate descriptions will be omitted.

[Principle of Image Determination]

First, the principle of image determination in one embodiment of the present invention will be described.

Figure 1A:
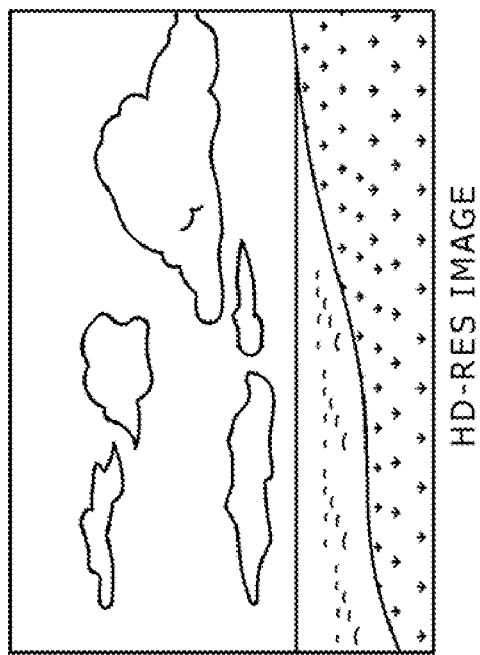
FIGS. 1A-1C are diagrams illustrating an HD-resolution image and an image upconverted from an SD-resolution image.
Figure 1C:
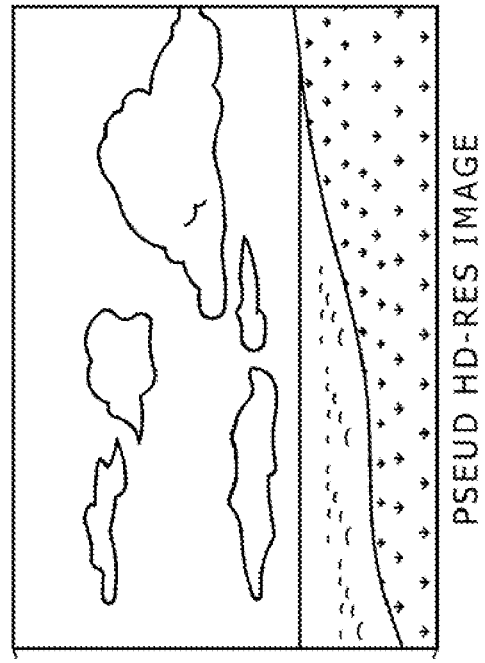
Figure 1B:
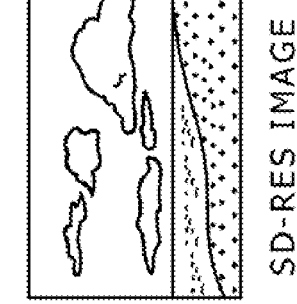

FIG. 1A-1C are diagrams illustrating an HD-resolution image (HD-RES IMAGE) and an image upconverted from an SD-resolution image (SD-RES IMAGE). In these diagrams, FIG. 1A shows the HD-resolution image. FIG. 1B shows the SD-resolution image. FIG. 1C shows an image (PSEUD HD-RES IMAGE, hereinafter referred to as "pseudo HD-resolution image") upconverted from the SD-resolution image.

As shown in FIG. 1C, the pseudo HD-resolution image does not necessarily have side panels added thereto as ineffective areas. Therefore, the image determination by developing technologies are incapable of determining a pseudo HD-resolution image not containing side panels such as shown in FIG. 1C. In view of this, in order to distinguish between an HD-resolution image and a pseudo HD-resolution image, an embodiment of the present invention utilizes differences in their frequency-amplitude characteristics.

FIG. 2 is a diagram illustrating frequency-amplitude characteristic differences between the HD-resolution image shown in FIG. 1A and the pseudo HD-resolution image shown in FIG. 1C. FIG. 2, in which the horizontal axis indicates normalized angular frequency and the vertical axis indicates power spectrum of the amplitude, represents a relationship between the frequency and the amplitude of the images.

Referring to FIG. 2, it is seen that both the HD-resolution image shown in FIG. 1A and the pseudo HD-resolution image shown in FIG. 1C have signals whose amplitudes are large in low frequencies (hereinafter referred to as "low frequency band") in FIG. 2, and that the amplitudes of their signals attenuate as the frequency increases. Here, frequency-amplitude characteristics such as shown in FIG. 2, in which the amplitude is large in the low frequency band and the amplitude attenuates with increasing frequency, are established in typical images such as natural images.

Here, comparing HD-resolution image signals and pseudo HD-resolution image signals based on FIG. 2, it is seen that signals of both images are distributed similarly in the low frequency band, but that their amplitude attenuation rates with increasing frequency differ. That is, in a frequency band (hereinafter referred to as "intermediate frequency band") higher than the low frequency band in FIG. 2, signals present in an area A in FIG. 2 are HD-resolution image signals, with only a few pseudo HD-resolution image signals found therein. Therefore, the amplitude attenuation rate relative to the low frequency band becomes larger for the pseudo HD-resolution image than for the HD-resolution image.

Furthermore, in a frequency band (hereinafter referred to as "high frequency band") still higher than the intermediate frequency band in FIG. 2, A difference between an almost no distribution of pseudo HD-resolution image signals and a distribution of HD-resolution image signals is recognized. In addition, the above-mentioned frequency-amplitude characteristics shown in FIG. 2 are similarly exhibited not only in the images shown in FIGS. 1A and 1C but also in almost all images.

Consequently, in the embodiments of the present invention, attention is given to the difference of attenuation rates relative to the low frequency band between an HD-resolution image and a pseudo HD-resolution image, an index (hereinafter referred to as "HD level") indicated in Equation 1 for their image determination is adopted.

HD level=(average value of|characteristic values equivalent to amplitudes in frequency band 2|)/ (average value of|characteristic values equivalent to amplitudes in frequency band 1|)    (Equation 1)

Here, the lower-limit frequency of the frequency band 1 in Equation 1 is set to a frequency lower than the lower-limit frequency of the frequency band 2. Therefore, from the frequency-amplitude characteristics shown in FIG. 2, the HD level takes a value 0≦HD level<1. In this Equation, the HD level equals 0 when there is no characteristic value (hereinafter referred to as "amplitude characteristic value") equivalent to the amplitude in the frequency band 2.

The amplitude characteristic value may be the amplitude itself, but may also be the power spectrum of the amplitude. The amplitude characteristic value is not limited to the above. Furthermore, the average values shown in Equation 1 may be obtained by arithmetic mean. The calculation method is not limited thereto, but may otherwise be geometric mean, or weighted mean with a predetermined weight given.

In Equation 1, the HD level is calculated based on the average values of absolute amplitude characteristic values to improve accuracy. However, instead of this calculation method, the HD level may be calculated based on amplitudes before their absolute values are obtained.

Since the HD level is a relative value based on the average value of the amplitude characteristic values in the frequency band 1 and the average value of the amplitude characteristic values in the frequency band 2, the HD level represents the above-mentioned differing attenuation rates between the HD-resolution image and the pseudo HD-resolution image shown in FIG. 2. Therefore, the closer to 0 (zero) the HD level for an image for determination is, the more probable it is that the image for determination will be a pseudo HD-resolution image. Conversely, the closer to 1 the HD level for an image for determination is, the more strongly one could say that the image for determination is an HD-resolution image.

First Embodiment

Figure 3:
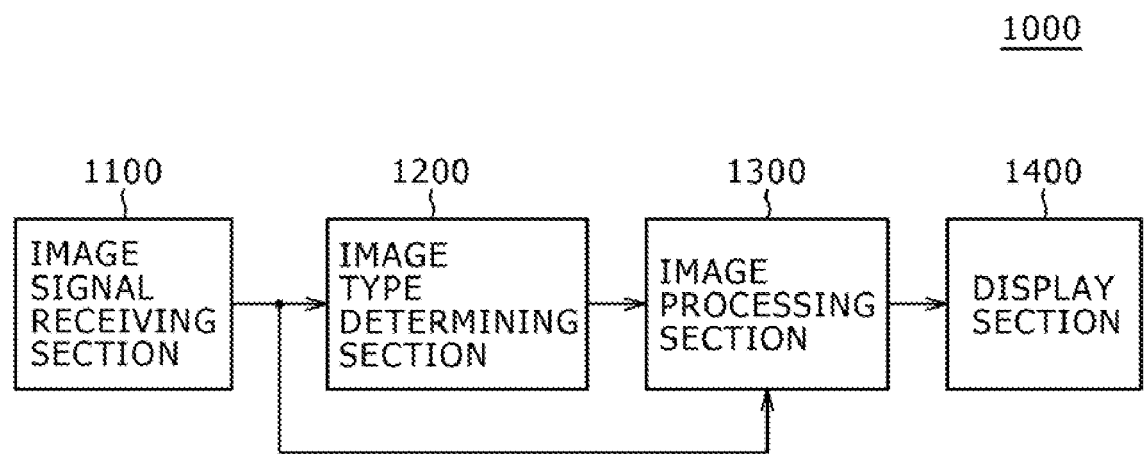
FIG. 3 is a diagram illustrating an image processing apparatus according to a first embodiment of the present invention.

Next, an image processing apparatus according to a first embodiment of the present invention will be described. FIG. 3 is a diagram illustrating an image processing apparatus 1000 according to the first embodiment of the present invention.

Referring to FIG. 3, the image processing apparatus 1000 according to the first embodiment of the present invention has an image signal receiving section 1100, an image type determination section 1200, an image processing section 1300, and a display section 1400. The image signal receiving section 1100 receives an image signal transmitted from a broadcasting station or the like, or an image signal of an image held in storage means, not shown, or the like. The image type determination section 1200 determines whether an image represented by the image signal is an HD-resolution image or a pseudo HD-resolution image. Image determination by the image type determination section 1200 will be described later.

The image processing section 1300 processes the image based on a determination result on the image obtained in the image type determination section 1200. The image processing section 1300 may process the image based on binary determination results. For example, if the image is determined as a pseudo HD-resolution image in the image type determination section 1200, the image may be processed using a predetermined parameter, whereas if the image is determined as an HD-resolution image, no processing may be performed on the image.

Also, the image processing section 1300 may select a parameter for performing processing based on the value of an HD level calculated by the image type determination unit 1200, and appropriately change its processing. Here, the parameter selection may be realized by providing the image processing unit 1300 with a parameter selecting unit, not shown, for selecting a parameter. Alternatively, the image processing apparatus 1000 may have the parameter selecting unit, not shown, independent of the image processing unit 1300.

The image processing method used by the image processing unit 1300 is not limited to the above. The image processing may be performed, e.g., by calculating a plurality of values of the HD level in the image type determination section 1200 and using the plurality of values of the HD level.

Furthermore, the image processing section 1300 may perform processing for enhancing the outline of the image (hereinafter referred to as "enhance processing"), contrast processing, noise reducing for reducing noise, and the like based on the determination result on the image from the image type determination section 1200. The image processing unit 1300 may perform various processing in addition to the above.

The display section 1400 displays the image processed by the image processing section 1300. The image displayed by the display section 1400 is an HD-resolution image or an image-processed, pseudo HD-resolution image. Therefore, the display section 1400 displays high-definition images.

[First Image Determination Method and Image Processing Method]

Figure 4:
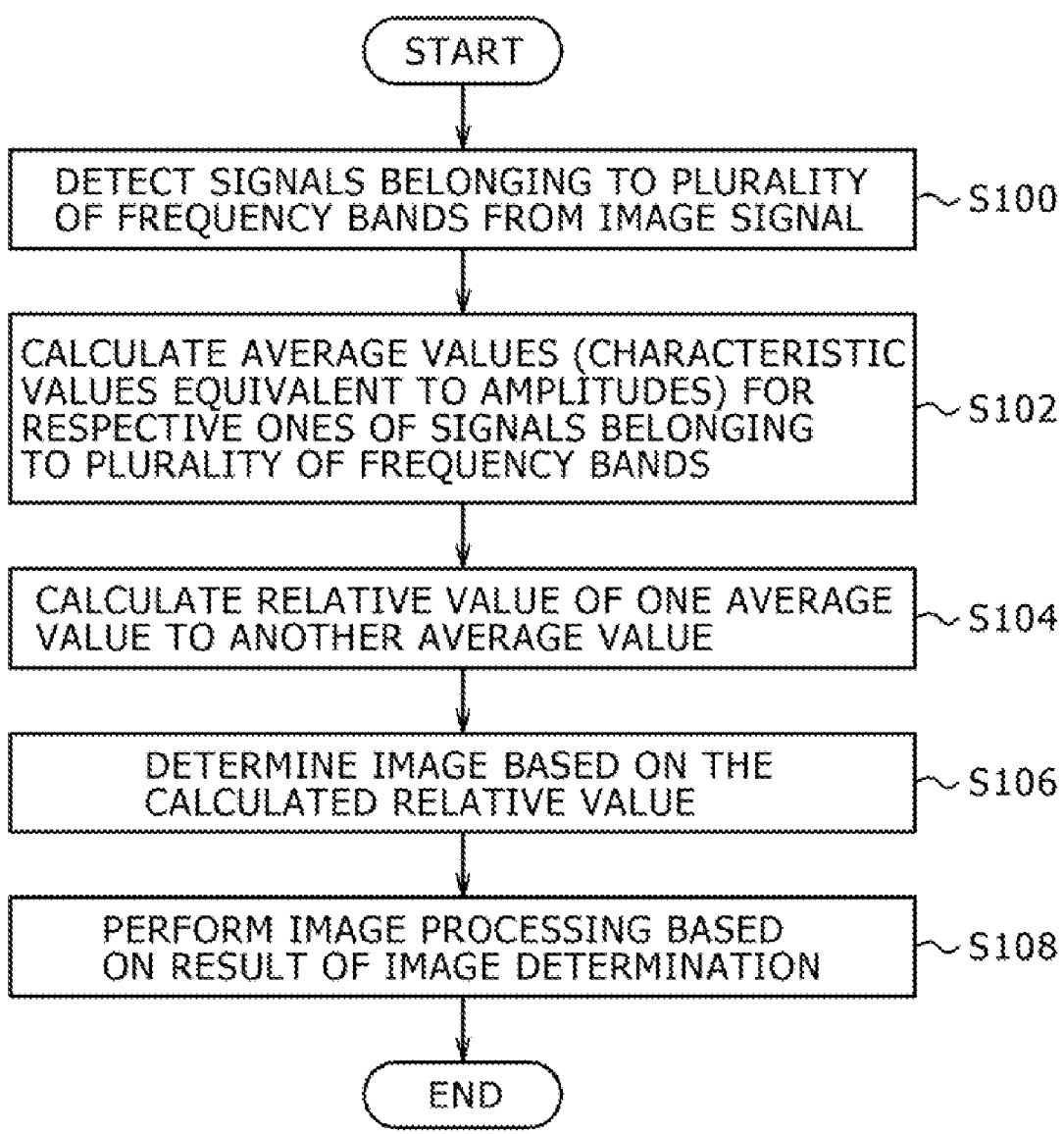
FIG. 4 is a flow diagram showing an image processing method according to an embodiment of the present invention.

Next, a first image determination method and image processing method according to an embodiment of the present invention will be described. FIG. 4 is a flow diagram showing the first image determination method and image processing method according to the embodiment of the present invention.

First, an image determination apparatus (image type determination section of the image processing apparatus) detects signals belonging to a plurality of frequency bands, from an input image signal (S100). The detection of the above signals is performed every pixel.

The image determination apparatus (image type determination section of the image processing apparatus) calculates average values of amplitude characteristic values, for respective ones of the signals belonging to the plurality of frequency bands detected every pixel in step S100 (S102). Here, the above-mentioned amplitude characteristic value may be an amplitude value itself, or may otherwise be its power spectrum. Furthermore, the average values may be calculated not only by arithmetic mean, but also by various other methods, such as geometric mean and weighted mean.

Of the average values calculated for respective ones of the signals belonging to the plurality of frequency bands in step S102, the image determination apparatus (image type determination section of the image processing apparatus) calculates a relative value of one of average values to another of the average values (S104). The relative value may be obtained by dividing such another average value by such one average value, or may alternatively be obtained by subtracting such one average value in logarithmic form from such another average value in logarithmic form.

The lower-limit frequency of a frequency band deriving such one average value is set to a value lower than the lower-limit frequency of a frequency band deriving such another average value. Therefore, the calculated relative value may represent the frequency-amplitude characteristic differences between the HD-resolution image and the pseudo HD-resolution image shown in FIG. 2.

The image determination apparatus (image type determination section of the image processing apparatus) determines the image based on the relative value calculated in step S104 (S106). Here, the closer to 0 (zero) the relative value becomes, the further more probable it is that the image will be a pseudo HD-resolution image, whereas the closer to 1 the relative value becomes, the further more probable it is that the image will be an HD-resolution image. Therefore, the image determination apparatus (image type determination section of the image processing apparatus) may determine the image based on a preset threshold. If the HD level is not less than the threshold, the image determination apparatus may determine the image as an HD-resolution image, and if the HD level is less than the threshold, the image determination apparatus may determine the image as a pseudo HD-resolution image.

The image determination in step S106 is not limited to the above. By recognizing the value of an HD level itself as a probability value indicating that the image is an HD-resolution image, how probable it is that the image will be an HD-resolution image may be determined.

As shown in the above-mentioned steps S100 to S106, the first image determination method according to the embodiment of the present invention determines an image by utilizing frequency-amplitude characteristic differences between an HD-resolution image and a pseudo HD-resolution image such as shown in FIG. 2, based on the relative value of the average value of amplitude characteristic values in a higher frequency band to the average value of amplitude characteristic values in a predetermined frequency band serving as a reference.

In the image processing method, the image is then processed based on a determination result on the image in step S106 (S108). Here, in step S108, the enhance processing, color adjustment, noise reducing, and the like may be performed. The image processing in step S108 is not limited to the above, but that various other processing may be performed.

As shown in the steps S100 to S108, image determination is performed, and image processing is then performed based on a determination result.

Consequently, the first image determination method and image processing method according to the embodiment of the present invention does not require that side panels be added during upconversion as described in the related art, and thus determines an image independently of any method by which the image is upconverted. Furthermore, the image determined by the first image determination method is processed.

As described above, the image processing apparatus according to the first embodiment of the present invention determines an image accurately independently of any method by which the image is upconverted, by using the frequency-amplitude characteristic differences between an HD-resolution image and a pseudo HD-resolution image, and thus performs processing suitable for the image. Thus, the image type determination section (image determination apparatus) according to an embodiment of the present invention will be described next, which utilizes the above-described principle of image determination according to the embodiment of the present invention.

First Embodiment of Image Type Determination Section (Image Determination Apparatus)

Figure 5:
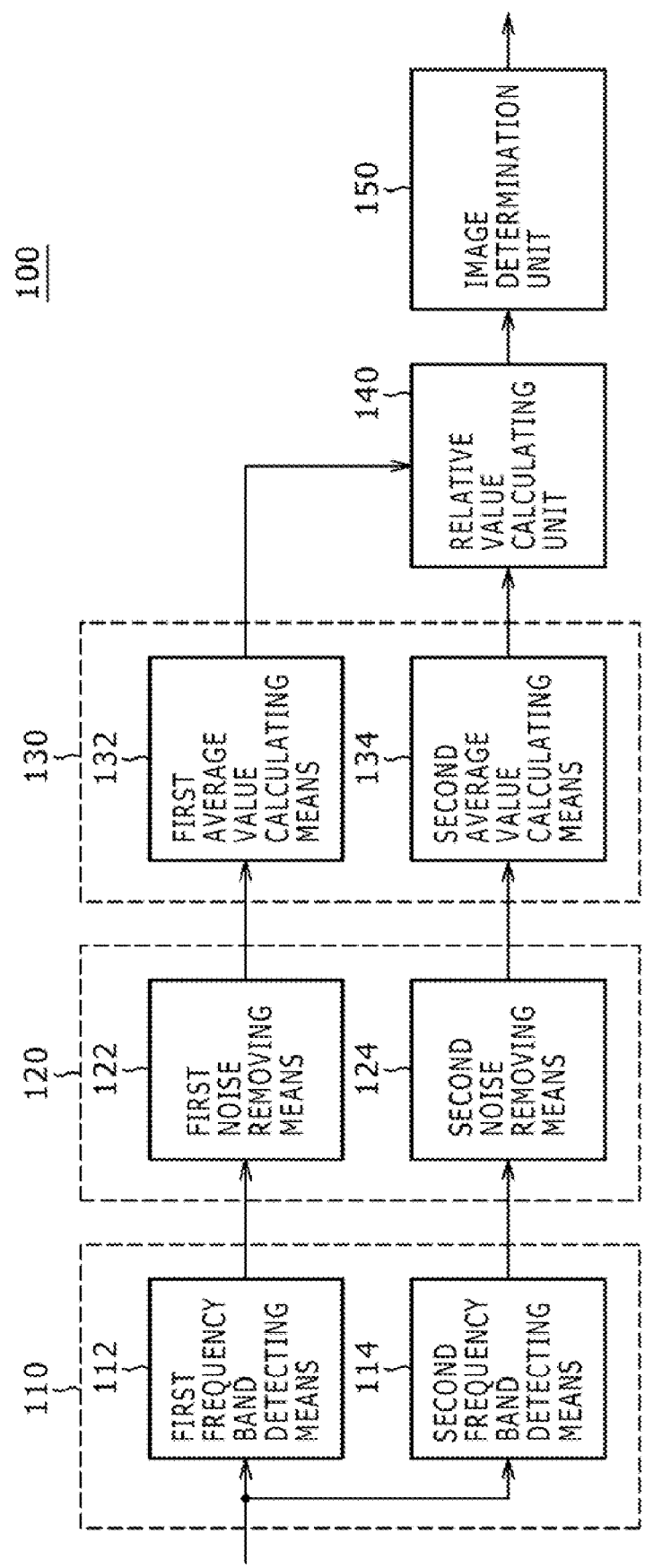
FIG. 5 is a diagram illustrating an image type determination unit according to a first embodiment of an image type determination unit.

FIG. 5 is a diagram illustrating an image type determination section 100 according to a first embodiment of the image type determination section.

Referring to FIG. 5, the image type determination section 100 according to the first embodiment of the image type determination section has a frequency band signal detecting unit 110, a noise removing unit 120, an average value calculating unit 130, a relative value calculating unit 140, and an image determination unit 150.

The image type determination section (image determination apparatus) 100 may have, e.g., a control unit, not shown, that is configured with an MPU (Micro Processing Unit) or the like and may control the whole image type determination section 100, a ROM (Read Only Memory), not shown, in which programs and control data, such as operation parameters, used by the control unit are recorded, a RAM (Random Access Memory), not shown, that temporarily stores a program executed by the control unit, and the like, a storage unit, not shown, that stores images to be determined by the image type determination section (image determination apparatus) 100, and the like, a receiving unit, not shown, that receives image signals transmitted from broadcasting stations and the like, an operation unit, not shown, that a user may operate, and the like. The image determination apparatus 100 interconnects the above components via a bus as a data transmission path. Here, the storage unit, not shown, includes, e.g., a magnetic recording medium such as a hard disk, a nonvolatile memory such as a flash memory, and a magneto-optical disk, but is not limited to the above. Furthermore, the operation unit, not shown, also includes, e.g., operation input devices, such as a keyboard, a mouse, buttons, direction keys, or their combinations, but is not limited to the above.

The image type determination unit (image determination apparatus) 100 is supplied with, e.g., an image signal transmitted from a broadcasting station or the like, or an image signal representing an image held in the storage unit, not shown, or the like. Here, the image signal supplied to the image determination apparatus 100 may represents a still image or a motion image (so-called video).

The frequency band signal detecting unit 110 has first frequency band signal detecting means 112 and second frequency band signal detecting means 114. The first frequency band signal detecting means 112 and the second frequency band signal detecting means 114 each performs processing every pixel, and may be configured with a band-pass filter (hereinafter referred to as "BPF") that allows passage of only image signals belonging to a specific frequency band and attenuates image signals belonging to other frequency bands.

The first frequency band signal detecting means 112 is configured with, e.g., a low-range BPF that allows passage of a frequency band lower than the upper limit of theoretically effective frequencies with respect to a Nyquist frequency in an image obtained by upconverting an SD-resolution image, and does not allow passage of dc (direct current) component.

The second frequency band signal detecting means 114 is configured with, e.g., an intermediate-range BPF that allows passage of frequencies near the upper limit of theoretically effective frequencies with respect to the Nyquist frequency in an image obtained by upconverting an SD-resolution image.

Here, the low-range BPF forming the first frequency band signal detecting means 112 and the intermediate-range BPF forming the second frequency band signal detecting means 114 may have their frequency bands partially overlapped with each other. Furthermore, the upper limits of theoretically effective frequencies with respect to the Nyquist frequency in an image obtained by upconverting an SD-resolution image differ from one upconverting method to another. That is, as shown in FIG. 2, if the Nyquist frequency normalized in the HD-resolutionolution and the pseudo HD-resolutionolution is a (a=π), an upper limit b of theoretically effective frequencies with respect to the Nyquist frequency in an image upconverted by the top and bottom crop method or the stretch method is b=(⅜)×a, whereas an upper limit c of theoretically effective frequencies with respect to the Nyquist frequency in an image upconverted by the side panel method is c=(4/9)×a.

Accordingly, e.g., the upper limit b of theoretically effective frequencies with respect to the Nyquist frequency may be set to the first frequency band signal detecting means 112 as a reference, whereas the upper limit c of theoretically effective frequencies with respect to the Nyquist frequency may be set to the second frequency band signal detecting means 114 as a reference. The upper limit b of theoretically effective frequencies with respect to the Nyquist frequency may be set to both the first frequency band signal detecting means 112 and the second frequency band signal detecting means 114, as a reference, instead of the above settings.

Furthermore, the BPF forming each of the first frequency band signal detecting means 112 and the second frequency band signal detecting means 114 need to decrease its side lobe in order to enhance its detection capability. Therefore, the BPF according to the first embodiment is configured by setting a filter coefficient using a function obtained by multiplying a Sinc function with a Hamming window function, and setting the number of a tap so as to correspond to the filter coefficient.

With the above configuration, the BPF according to the first embodiment of the image type determination unit makes the side lobe smaller and makes the main lobe nearer to a square wave than using a discrete Fourier transform. The window function used to set the filter coefficient is not limited to the Hamming window function, but may be a Hanning window function, a Gaussian window function, and the like. Furthermore, the BPF according to the first embodiment of the image type determination unit is not limited to the above configuration. A digital filter may alternatively be used.

The first frequency band signal detecting means 112 and the second frequency band signal detecting means 114 each may be configured, not only with a BPF, but also with a high-pass filter that allows passage of only image signals having frequencies not lower than a cutoff frequency and attenuates image signals having frequencies lower than the cutoff frequency. Alternatively, the first frequency band signal detecting means 112 and the second frequency band signal detecting means 114 each may be configured with a low-pass filter that allows passage of only image signals having frequencies below a cutoff frequency and attenuates image signals having frequencies higher than the cutoff frequency. However, when a low-pass filter is used, affected by an average value brightness equivalent to a signal whose frequency is 0 (zero), the low-pass filter may not distinguish between an HD-resolution image and a pseudo HD-resolution image accurately, depending on the average brightness.

In this case, the frequency band signal detecting unit 110 is preferably a filter that does not allow passage of image signals whose frequency is 0 (zero), and may be configured not only with a BPF, but also with an arbitrary filter.

The noise removing unit 120 has first noise removing means 122 and second noise removing means 124. The first noise removing means 122 removes noise of image signals filtered every pixel by the first frequency band signal detecting means 112, and outputs an amplitude characteristic value for each pixel. Also, the second noise removing means 124 removes noise of image signals filtered every pixel by the second frequency band signal detecting means 114.

Here, the noise removal by the noise removing unit 120 may be performed by presetting an amplitude characteristic value threshold deemed as noise for each of the frequency bands passed by the frequency band signal detecting unit 110. Alternatively, the noise removal by the noise removing unit 120 may be performed by providing a noise measuring unit, not shown, by which the image type determination unit 100 detects noise for each of the frequency bands passed by the frequency band signal detecting unit 110, and based on the noise measurement results obtained by the noise measuring unit. Note that the noise removing means in the noise removing unit 120 may not be limited to the above.

The average value calculating unit 130 has first average value calculating means 132 and second average value calculating means 134. The first average value calculating means 132 is supplied with pixel-based amplitude characteristic values from which noise is removed by the first noise removing means 122, and the first average value calculating means 132 calculates an average value of absolute amplitude characteristic values. Also, the second average value calculating means 134 is supplied with pixel-based amplitude characteristic values from which noise is removed by the second noise removing means 124, and the second average value calculating means 134 calculates an average value of absolute amplitude characteristic values.

Here, the first average value calculating means 132 and the second average value calculating means 134 obtains the average values by arithmetic mean. The average value calculating method in the average value calculating unit 130 is not limited to arithmetic mean, but may include various methods such as, e.g., geometric mean and weighted mean.

The relative value calculating unit 140 calculates a relative value of the outputs from the average value calculating unit 130, i.e., the average values of absolute amplitude characteristic values outputted respectively from the first average value calculating means 132 and the second average value calculating means 134. Here, the relative value calculated by the relative value calculating unit 140 corresponds to the HD level indicated in Equation 1. Therefore, the relative value in the relative value calculating unit 140 may be calculated by, e.g., the following Equation 2 according to Equation 1.

HD level=relative value calculated by relative value calculating unit 140=(average value calculated by second average value calculating means 134)/ (average value calculated by first average value calculating means 132)     (Equation. 2)

The method for calculating the relative value, i.e., the HD level by the relative value calculating unit 140 is not limited to Equation 2, but may include, e.g., a method using a logarithmic expression.

The image determination unit 150 determines an image using the relative value, i.e., the HD level calculated by the relative value calculating unit 140. As mentioned earlier, it becomes all the more probable that the image for determination will be a pseudo HD-resolution image as the HD level calculated by the relative value calculating unit 140 takes a value closer to 0 (zero). Conversely, it becomes very highly probable that the image for determination will be an HD-resolution image if the HD level calculated by the relative value calculating unit 140 takes a value closer to 1. Therefore, the image determination unit 150 determines, based on a preset threshold, that the image is an HD-resolution image if the HD level is not less than the threshold, or that the image is a pseudo HD-resolution image if the HD level is less than the threshold.

The image determination by the image determination unit 150 is not limited to the above. The image determination unit 150 may determine how probable it is that the image will be an HD-resolution image, by recognizing the value of an HD level itself as a probability value indicating that the image is an HD-resolution image.

Furthermore, the image determination unit 150 outputs a determination result on the image. Here, the determination result outputted from the image determination unit 150 may be, e.g., a digital signal indicating either an HD-resolution image or a pseudo HD-resolution image. The determination result outputted from the image determination unit 150 is not limited to the above, and may include the value of an HD level itself.

As described above, the image type determination section 100 according to the first embodiment of the image type determination section determines an image, by utilizing frequency-amplitude characteristic differences between an HD-resolution image and a pseudo HD-resolution image such as shown in FIG. 2, based on the relative value of the average value of amplitude characteristic values in the intermediate frequency band to the average value of amplitude characteristic values in the low frequency band.

Therefore, the image type determination unit 100 according to the first embodiment of the image type determination unit does not require that side panels be added during upconversion of an SD-resolution image as in the related-art image type determination units, and thus determines an image independently of any method by which the image is upconverted.

[Program for Image Determination]

With a program for causing the above-described image type determination section 100 according to the first embodiment of the image type determination section to function as a computer, the image type determination section determines an image independently of any method by which the image is upconverted.

Second Embodiment of Image Type Determination Section (Image Determination Apparatus)

Figure 6:
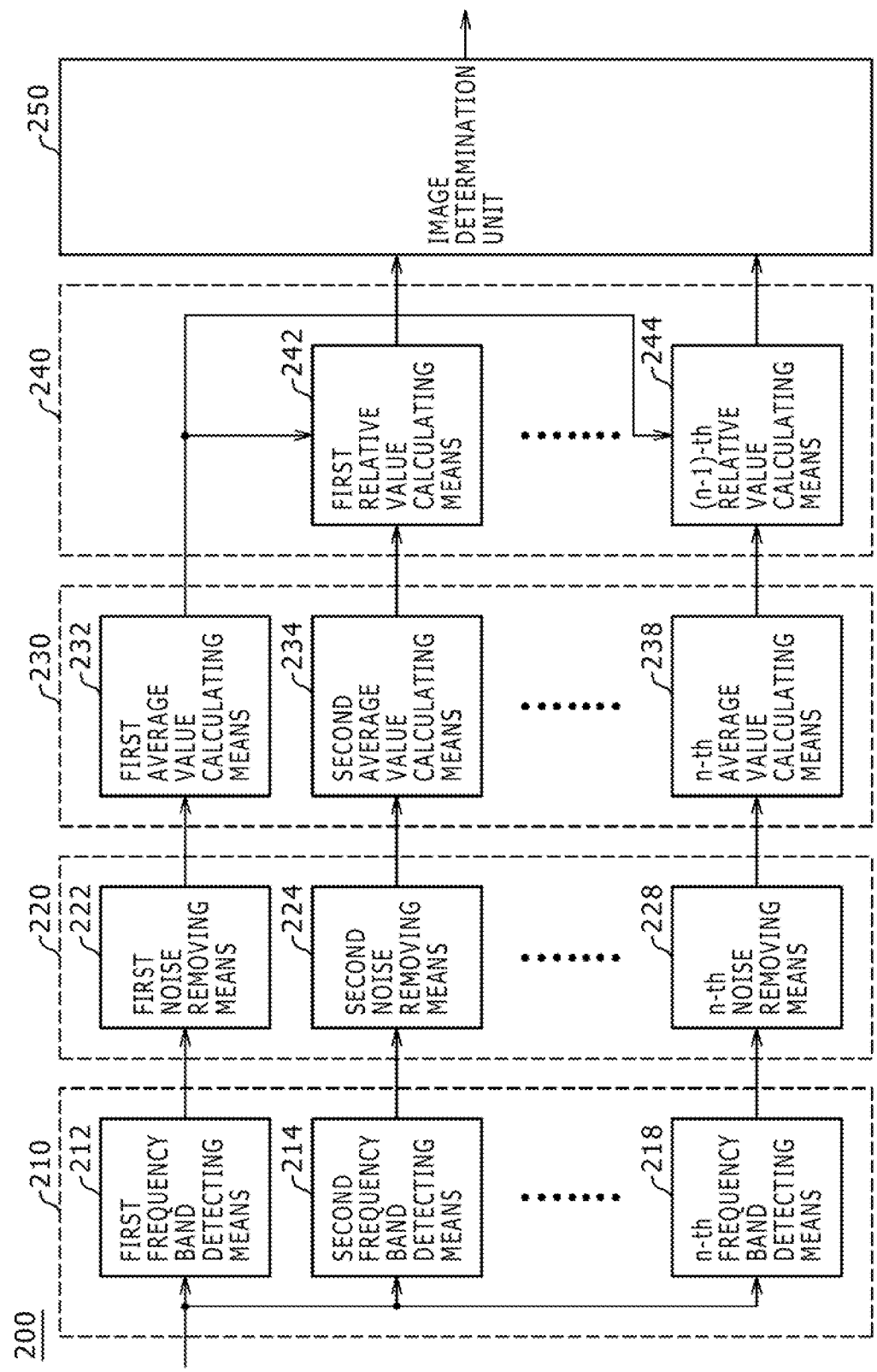
FIG. 6 is a diagram illustrating an image type determination unit according to a second embodiment of the image type determination unit.

In the image type determination section 100 according to the first embodiment of the image type determination section (image determination apparatus), a configuration has been described in which a single relative value is calculated as the HD level. Next, an image determination apparatus (image type determination section) will be described which performs image determination by a configuration for calculating a plurality of relative values as HD levels. FIG. 6 is a diagram illustrating an image type determination unit 200 according to a second embodiment of the image type determination unit.

Referring to FIG. 6, the image type determination section 200 according to the second embodiment of the image type determination section has a frequency band signal detecting unit 210, a noise removing unit 220, an average value calculating unit 230, a relative value calculating unit 240, and an image determination unit 250.

The image determination apparatus 200 may have, similarly to the image determination apparatus 100 according to the first embodiment, e.g., a control unit, not shown, configured with an MPU or the like, a ROM, not shown, a RAM, not shown, a storage unit, not shown, a receiving unit, not shown, an operation unit, not shown, and the like.

The basic operation and advantages of the various parts of the image type determination section 200 is similar to those of the image type determination section 100 according to the first embodiment of the image type determination section. The image type determination section 200 differs from the image type determination section 100 in that the frequency band signal detecting unit 210 has first frequency band detecting means 212 to nth frequency band-detecting means 218 (where n is an integer not less than 3), i.e., three or more frequency band detecting means. Here, the frequency band detecting means of the frequency band signal detecting unit 210 may each be configured with a BPF similarly to that in the image type determination unit 100. However, it is configured such that, as the value of n increases from the first frequency band detecting means 212, to the second frequency band detecting means 214, third frequency band detecting means, . . . nth frequency band detecting means 218, the lower limit of frequencies whose passage is allowed by the corresponding BPF also increases.

Similarly, the image type determination section 200 differs from the image type determination unit 100 in that the noise removing unit 220 has first noise removing means 222 to n-th noise removing means 228, and the average value calculating unit 210 has first average value calculating means 232 to nth average value calculating means 238, and further the relative value calculating unit 240 has first relative value calculating means 242 to (n–1)-th relative value calculating means 238. Furthermore, a plurality of relative values are supplied to the image determination unit 250.

Here, the first relative value calculating means 242 of the relative value calculating unit 240 calculates a relative value of an average value calculated by the second average value calculating means 234 to an average value calculated by the first average value calculating means 232, and the (n–1)-th relative value calculating means 244 calculates a relative value of an average value calculated by the nth average value calculating means 238 to the average value calculated by the first average value calculating means 232. Therefore, the relative value calculating unit 240 calculates a plurality of relative values based on the average value calculated by the first average value calculating means 232 as a reference.

The image determination unit 250 performs image determination, using the plurality of relative values calculated by the relative value calculating unit 240. Here, the image determination unit 250 performs image determination based on one of the plurality of relative values. For example, the image determination unit 250 performs image determination based on whether a relative value which is among a plurality of relative values larger than 0 (zero) and which is calculated by using a frequency band having the highest lower limit, i.e., a relative value which is calculated by relative value calculating means having the largest n, is not less or less than a predetermined threshold. The image determination based on a single relative value is not limited to the above. An arbitrary one of the calculated relative values may be used.

Here, as shown in FIG. 2, the higher the frequency, the smaller the difference between the average values of amplitudes of the signals contained in the HD-resolution image and the pseudo HD-resolution image. Therefore, the image determination unit 250, e.g., presets a plurality of thresholds to be used for image determination, one for each frequency band, and performs image determination by suitably changing the threshold every frequency band to be used for the image determination.

Also, the image determination unit 250 performs image determination based on a plurality of calculated relative values. For example, the image determination unit 250 performs the above-mentioned threshold-based image determination on each of all the plurality of calculated relative values to obtain clusters of determination results, and take a larger one of the clusters as its final image determination result. The image determination based on a plurality of relative values is not limited to the above. An arbitrary number of calculated relative values may be used.

Alternatively, the image determination by the image determination unit 250 may be performed, e.g., by calculating, for each of the plurality of relative values calculated by the relative value calculating unit 240, a difference from the corresponding threshold used for the image determination, and then calculating an average value and a standard deviation of a plurality of the thus calculated differences. In the above case, when the standard deviation does not take a value within a predetermined range, the image determination unit 250 excludes any large one of the differences as an abnormal value, and re-calculates an average value and a standard deviation of the resultant differences. And the above-mentioned operation is repeated until the standard deviation takes a value within the predetermined range. When the standard deviation finally equals a value within the predetermined range, if the average value of the differences is a positive value, the image determination unit 250 determines the image as an HD-resolution image, and if the average value of the differences is a negative value, it determines the image as a pseudo HD-resolution image. The image determination by the image determination unit 250 is not limited to the above.

The image determination unit 250 outputs a determination result on the image. The determination result outputted from the image determination unit 250 may be, e.g., a digital signal representing either an HD-resolution image or a pseudo HD-resolution image, similarly to the case of the image determination unit 150 according to the first embodiment of the image type determination unit. Furthermore, the image determination unit 250 may also output a plurality of HD levels which are larger than 0 (zero).

Alternatively, in addition to the digital signal, the image determination unit 250 may selectively output the value of a single HD level which is among a plurality of relative values, i.e., a plurality of HD levels larger than 0 (zero). Here, if the determination result outputted from the image determination unit 250 is the value of an HD level, the image determination unit 250 outputs the value of an HD level which is, e.g., among HD levels larger than 0 (zero) and which is calculated by relative value calculating means having the largest n. As shown in FIG. 2, typical images exhibit frequency-amplitude characteristics in which their amplitude attenuates as the frequency increases. Therefore, by causing the image processing unit 1300 to perform image processing such as the enhance processing on an image signal having an amplitude and belonging to the highest frequency band, image quality is effectively improved. The value of an HD level selected by the image determination unit 250 may be the value of an HD level in an arbitrary frequency band.

As described above, the image type determination section 200 according to the second embodiment of the image type determination section performs image determination, by utilizing frequency-amplitude characteristic differences between an HD-resolution image and a pseudo HD-resolution image such as shown in FIG. 2, and by further calculating a plurality of relative values, each being calculated as a relative value of the average value of amplitude characteristic values in a higher one of frequency bands to the average value of amplitude characteristic values in the low frequency band, and using the plurality of relative values.

Therefore, the image type determination section 200 according to the second embodiment of the image type determination section does not require that side panels be added during upconversion of an SD-resolution image as in the related-art image type determination units, and thus determines an image independently of any method by which the image is upconverted.

Furthermore, the image type determination section 200 according to the second embodiment of the image type determination section determines an image using a plurality of relative values. Therefore, e.g., even if an image does not have signals in a specific frequency band, the image type determination section 200 determines the image based on signals in other frequency bands.

[Program for Image Determination]

With a program for causing the above-described image determination apparatus 200 (image type determination section 200) according to the second embodiment of the present invention to function as a computer, the image determination apparatus 200 may determine an image independently of any method by which the image is upconverted.

Third Embodiment of Image Type Determination Section (Image Determination Apparatus)

Figure 7:
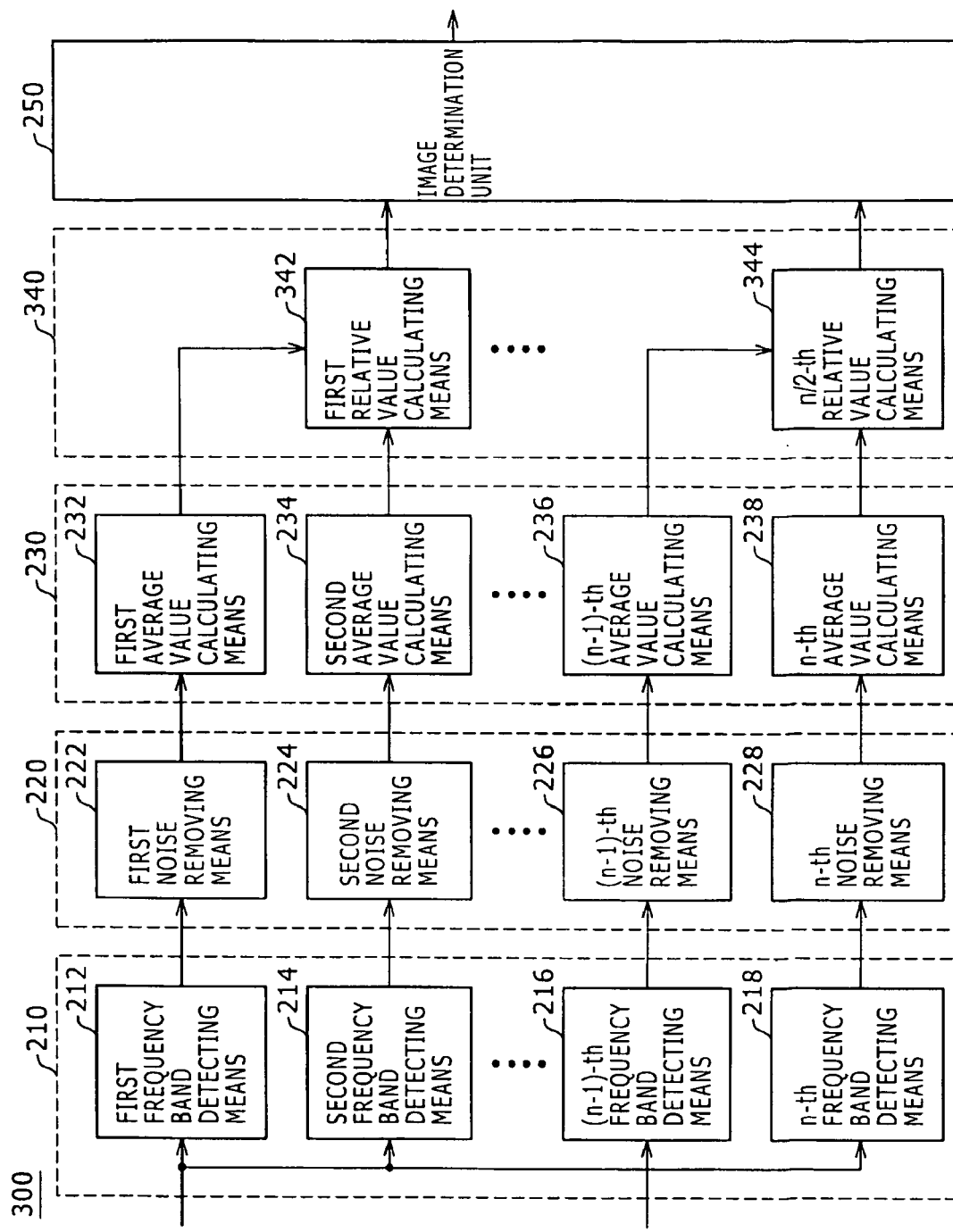
FIG. 7 is a diagram illustrating an image type determination unit according to a third embodiment of the image type determination unit.

Next, an image type determination unit (image determination apparatus) according to a third embodiment of the image type determination unit will be described. FIG. 7 is a diagram illustrating an image type determination section 300 according to the third embodiment of the image type determination section.

Referring to FIG. 7, the image type determination section 300 according to the third embodiment of the image type determination section has a configuration and a function similar to those of the image type determination section 200 according to the second embodiment of the image type determination section shown in FIG. 6. When compared with the image type determination section 200, reference values differ which are used when first relative value calculating means 342 to n/2-th relative value calculating means 344 of a relative value calculating unit 340 calculate respective relative values.

Also, the image determination apparatus 300 may have, similarly to the image determination apparatus 100 according to the first embodiment, e.g., a control unit, not shown, configured with an MPU or the like, a ROM, not shown, a RAM, not shown, a storage unit, not shown, a receiving unit, not shown, an operation unit, not shown, and the like.

Specifically, in the image type determination section 300, the first relative value calculating means 342 calculates a relative value of an average value calculated by the second average value calculating means 234 to an average value calculated by the first average value calculating means 232, and the n/1-th relative value calculating means 344 calculates a relative value of an average value calculated by the nth average value calculating means 238 to an average value calculated by the n/1-th average value calculating means 236. Therefore, unlike the image type determination section 200 according to the second embodiment of the image type determination section in which all the relative values are calculated using the average value calculated by the first average value calculating means 232 as a reference, the image type determination section 300 according to the third embodiment of the image type determination section differs in that, when calculating a relative value, the image type determination section 300 changes the frequency band from which an average value serving as a reference for calculating the relative value is derived.

The image type determination section (image determination apparatus) 300 according to the third embodiment of the image type determination section calculates relative values as mentioned above, whereby even when determination a special image that does not exhibit frequency-amplitude characteristics such as shown in FIG. 2, and thus that, e.g., has no amplitude characteristic value in low frequencies, the image type determination section 300 is enabled to determine the image using amplitude characteristic values in, e.g., the intermediate frequency band as a reference.

Furthermore, as to the method for determination an image using relative values and the method for outputting a determination result, the image type determination section (image determination apparatus) 300 performs similarly to the image type determination section 200 according to the second embodiment of the image type determination section.

As described above, the image type determination section (image determination apparatus) 300 according to the third embodiment of the image type determination section uses frequency-amplitude characteristic differences between an HD-resolution image and a pseudo HD-resolution image such as shown in FIG. 2, and sets a plurality of frequency bands each serving as a reference, whereby the image type determination section 300 calculates relative values, each being calculated as a relative value of an average value of amplitude characteristic values in a higher one of the frequency bands to an average value of amplitude characteristic values in a frequency band serving as a reference. Then, the image type determination section (image determination apparatus) 300 performs image determination, using the plurality of calculated relative values.

Therefore, the image type determination section 300 according to the third embodiment of the image type determination section does not require that side panels be added during upconversion of an SD-resolution image as in the related-art image type determination units, and thus determines an image independently of any method by which the image is upconverted.

Furthermore, even if an image for determination is a special image that does not have frequency-amplitude characteristics such as shown in FIG. 2, the image type determination section 300 according to the third embodiment of the image type determination section may determine the image without being restricted by the type of image.

[Program for Image Determination]

With a program for causing the above-described image determination apparatus 300 according to the third embodiment of the present invention to function as a computer, the image determination apparatus 300 determines an image independently of any method by which the image is upconverted.

Fourth Embodiment of Image Type Determination Section (Image Determination Apparatus)

In the above-described first to third embodiments of the image type determination section according to the present invention, the image type determination sections have been described which determine whether an entire image for determination is an HD-resolution image or a pseudo HD-resolution image. However, there may be some cases where an image signal transmitted from a broadcasting station or the like represents an image in which an HD-resolution image and a pseudo HD-resolution image are mixed. In view of this, an embodiment will be described next, which, when an HD-resolution image and a pseudo HD-resolution image are mixed, may perform image determination on each of the images.

Figure 8A:
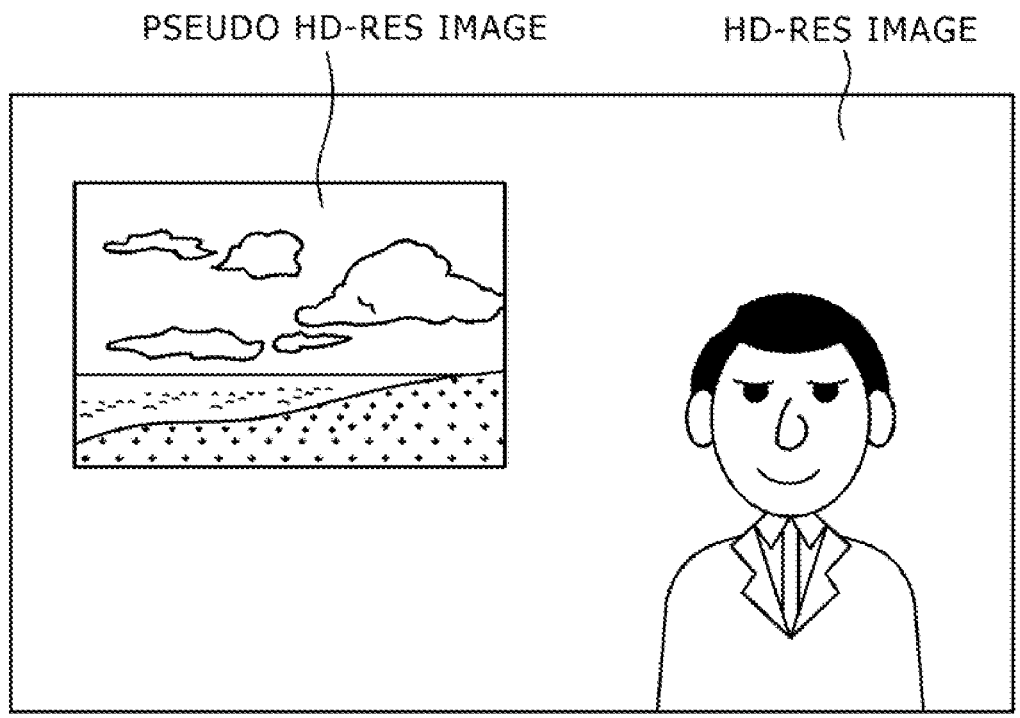
FIGS. 8A and 8B are diagrams illustrating an image in which an HD-resolution image and a pseudo HD-resolution image are mixed.
Figure 8B:
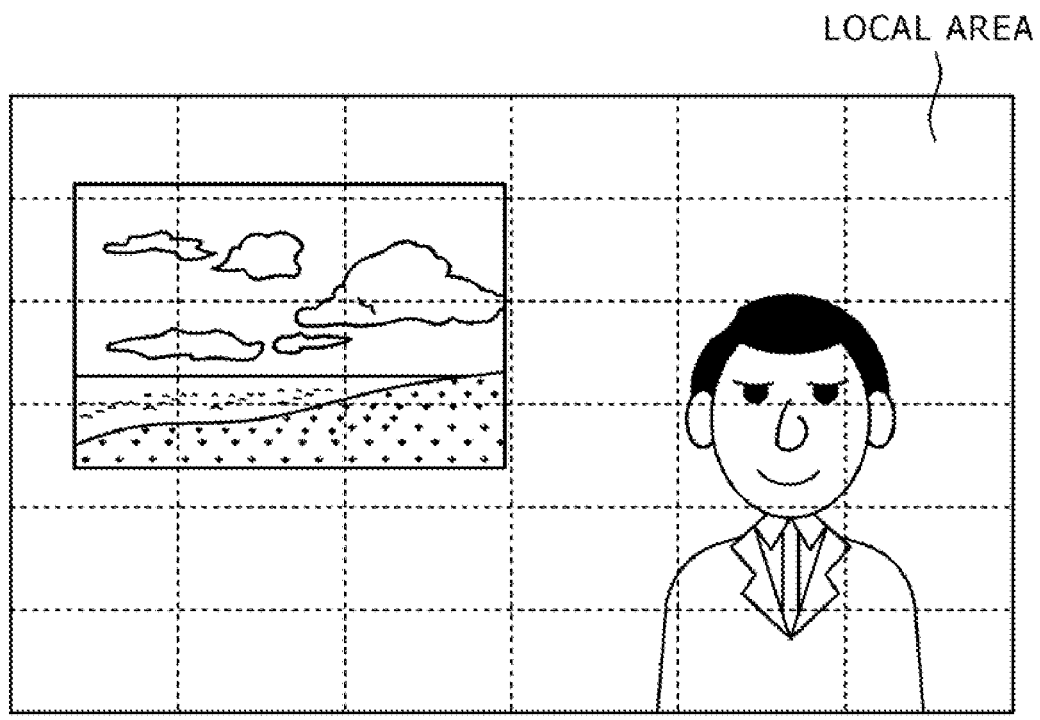

FIGS. 8A and 8B are diagrams illustrating an image in which an HD-resolution image and a pseudo HD-resolution image are mixed. FIG. 8A is a diagram illustrating an image in which an HD-resolution image and a pseudo HD-resolution image are mixed, and FIG. 8B is a diagram illustrating the image of FIG. 8A divided into local areas.

As shown in FIG. 8A, e.g., in a news show, there may be a case where an HD-resolution image and a pseudo HD-resolution image are mixed. In the case of an image such as shown in FIG. 8A, even if determination is made on the entire image, an accurate determination result may not be obtained. Thus, to overcome this situation, an image determination apparatus (image type determination section) will be described, which determines an image every local area by dividing the entire image into a plurality of local areas, as a fourth embodiment of the image type determination section according to one embodiment of the present invention.

Figure 9:
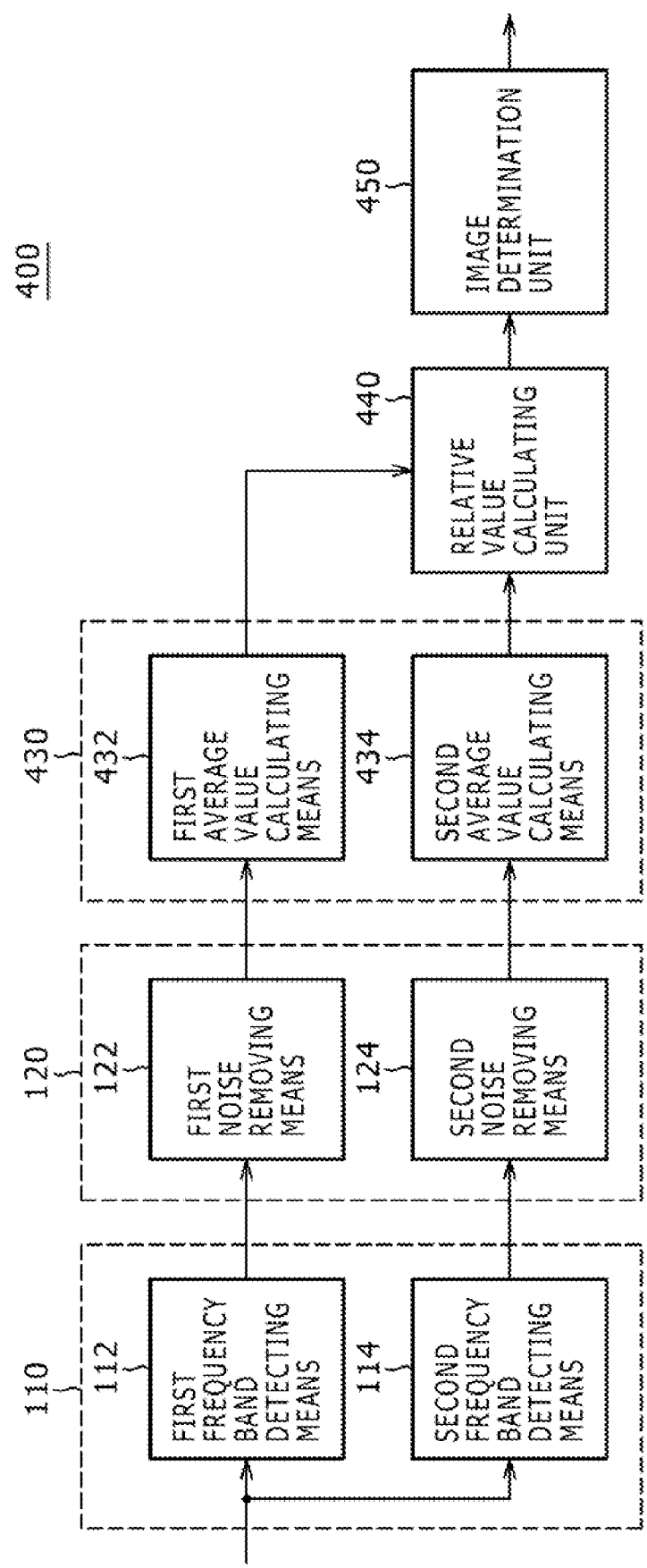
FIG. 9 is a diagram illustrating an image type determination unit according to a fourth embodiment of the image type determination unit.

FIG. 9 is a diagram illustrating an image type determination section 400 according to the fourth embodiment of the image type determination section.

Referring to FIG. 9, the image type determination section 400 according to the fourth embodiment of the image type determination section has a configuration similar to that of the image type determination section 100 according to the first embodiment of the image type determination section. When compared with the image type determination section 100, an average value calculating unit 430, a relative value calculating unit 440, and an image determination unit 450 are different.

Also, the image determination apparatus 400 may have, similarly to the image determination apparatus 100 according to the first embodiment, e.g., a control unit, not shown, configured with an MPU or the like, a ROM, not shown, a RAM, not shown, a storage unit, not shown, a receiving unit, not shown, an operation unit, not shown, and the like.

The frequency band signal detecting unit 110 has the first frequency band signal detecting means 112 and the second frequency band signal detecting means 114. Similarly to the image type determination section 100 according to the first embodiment of the image type determination section, the first frequency band signal detecting means 112 and the second frequency band signal detecting means 114 each perform processing every pixel, and allow passage of only image signals belonging to a specific frequency band.

The noise removing unit 120 has the first noise removing means 122 and the second noise removing means 124. Similarly to the image type determination section 100 according to the first embodiment of the image type determination section, the first noise removing means 122 removes noise of image signals filtered every pixel by the first frequency band signal detecting means 112, and outputs an amplitude characteristic value for each pixel. Also, the second noise removing means 124 removes noise of image signals filtered every pixel by the second frequency band signal detecting means 114.

The average value calculating unit 430 includes first average value calculating means 432 and second average value calculating means 434. As mentioned earlier, the first average value calculating means 132 according to the first embodiment of the image type determination unit is supplied with pixel-based amplitude characteristic values from which noise is removed by the first noise removing means 122, and the first average value calculating means 132 calculates an average value of absolute amplitude characteristic values for the entire image. By contrast, the first average value calculating means 432 according to the fourth embodiment of the image type determination unit is supplied with pixel-based amplitude characteristic values from which noise is removed by the first noise removing means 122, and the first average value calculating means 432 calculates an average value of absolute amplitude characteristic values for each of local areas such as shown in FIG. 8B.

Similarly, the second average value calculating means 434 according to the fourth embodiment of the image type determination section is supplied with pixel-based amplitude characteristic values from which noise is removed by the second noise removing means 124, and the second average value calculating means 434 may calculate an average value of absolute amplitude characteristic values for each of local areas such as shown in FIG. 8B.

All the local areas need not be uniform in size such as shown in FIG. 8B, but each local area may be of any size. Furthermore, adjacent local areas may partially overlap with each other.

Furthermore, as to information about the position, size, and the like of each local area, e.g., the average value calculating unit 430 may have storage means, and the storage means may hold the information. Here, the storage means of the average value calculating unit 430 includes, e.g., a nonvolatile memory, such as an EEPROM (Electrically Erasable and Programmable Read Only Memory), a flash memory, an MRAM (Magnetoresistive Random Access Memory), an FeRAM (Ferroelectric Random Access Memory), or a PRAM (Phase change Random Access Memory), but is not limited to the above. The information about the local areas used for the calculation of average values by the average value calculating unit 430 may be stored in the storage unit, not shown, of the image determination apparatus 400, and suitably read by the average value calculating unit 430 from that storage unit, not shown.

The relative value calculating means 440 calculates relative values every local area, for local-area-based average values calculated by the average value calculating unit 430. The relative value calculating unit 440 calculates each relative value similarly to the image type determination section 100 according to the first embodiment of the image type determination section.

The image determination unit 450 performs image determination every local area based on the local-area-based relative values calculated by the relative value calculating unit 440. The image processing section 1300 that processes a determination result outputted for each local area performs image processing such as the enhance processing for each local area.

Modified Example of Image Determination
Apparatus (Image Type Determination Unit)
According to Fourth Embodiment FIG. 9 shows a configuration similar to that of the image type determination section 100 according to the first embodiment of the image type determination section. However, the fourth embodiment of the present invention is not limited to the above configuration, but may have a configuration similar to that of the image type determination section 200 according to the second embodiment of the image type determination section, or of the image type determination section 300 according to the third embodiment of the image type determination section. Therefore, the image type determination section 400 according to the fourth embodiment of the image type determination section performs image determination by calculating one or a plurality of relative values according to its configuration.

As described above, the image type determination section 400 according to the fourth embodiment of the image type determination section performs image determination, by utilizing frequency-amplitude characteristic differences between an HD-resolution image and a pseudo HD-resolution image such as shown in FIG. 2, based on the relative value of the average value of amplitude characteristic values in the intermediate frequency band to the average value of amplitude characteristic values in the low frequency band. Furthermore, the image type determination section 400 performs image determination every local area, and thus performs image determination accurately even on an image in which an HD-resolution image and a pseudo HD-resolution image are mixed.

Therefore, the image type determination section 400 according to the fourth embodiment of the image type determination section does not require that side panels be added during upconversion of an SD-resolution image as in the related-art image type determination units, and thus determines an image independently of any method by which the image is upconverted.

Furthermore, the image type determination section 400 according to the fourth embodiment of the image type determination section determines an image every local area by dividing the entire image into local areas, whereby the image type determination section 400 performs image determination even on an image in which an HD-resolution image and a pseudo HD-resolution image are mixed, i.e., an image not assumed to be processed in the related-art image type determination units.

[Program for Image Determination]

With a program for causing the above-described image type determination section 400 according to the fourth embodiment of the image type determination section to function as a computer, the image type determination section 400 determines an image independently of any method by which the image is upconverted. Also, the image type determination section 400 performs image determination accurately even on an image in which an HD-resolution image and a pseudo HD-resolution image are mixed.

Fifth Embodiment of Image Type Determination
Section (Image Determination Apparatus)

Figure 10:
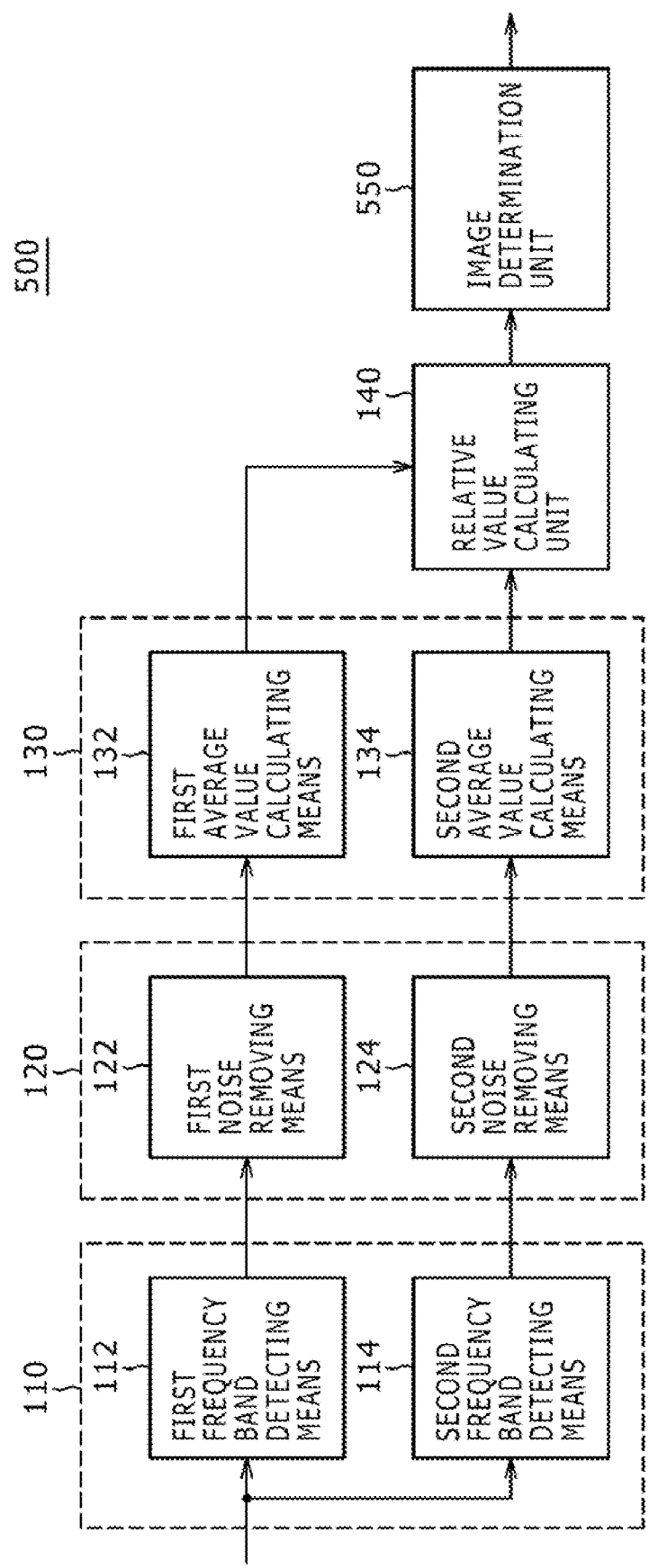
FIG. 10 is a diagram illustrating an image type determination unit according to a fifth embodiment of the image type determination unit.

Next, a fifth embodiment of the image type determination section according to the present invention will be described, which is another embodiment that is capable of performing image determination on an image in which an HD-resolution image and a pseudo HD-resolution image are mixed. FIG. 10 is a diagram illustrating an image type determination section 500 according to the fifth embodiment of the image type determination section.

Referring to FIG. 10, the image type determination section 500 according to the fifth embodiment of the image type determination section has a configuration similar to that of the image type determination section 100 according to the first embodiment of the image type determination section, and the frequency band signal detecting unit 110, noise removing unit 120, and average value calculating unit 130 have functions similar to those in the image type determination unit 100.

In the first to fourth embodiments of the image type determination section according to the present invention, an image signal supplied to the image type determination sections represents the entire image. By contrast, the image type determination section 500 according to the fifth embodiment of the image type determination section is supplied with image signals respectively corresponding to local areas beforehand. As a result of the above configuration, the image type determination section 500, when compared with the image type determination section 100, differs in an image determination unit 550 thereof from the image determination unit 150 according to the first embodiment of the image type determination section.

The image determination apparatus 500 may have, similarly to the image determination apparatus 100 according to the first embodiment, e.g., a control unit, not shown, configured with an MPU or the like, a ROM, not shown, a RAM, not shown, a storage unit, not shown, a receiving unit, not shown, an operation unit, not shown, and the like.

The image determination unit 550 performs image determination from one local area to another based on relative values calculated by the relative value calculating unit 140, i.e., local-area-based relative values. Here, the image determination unit 550 processes an image signal corresponding to one local area throughout a period from when the first frequency band signal detecting means 112 and the second frequency band signal detecting means 114 of the frequency band signal detecting unit 110 each detect signals belonging to a predetermined frequency band to when the image determination unit 550 determines an image represented by the image signal. Thus, the image of a local area is determined using only the frequency-amplitude characteristics of the image of the local area. Therefore, the image type determination section 500 according to the fifth embodiment of the image type determination section needs no processing for separating an image signal representing the entire image into signals respectively representing local areas, and thus reduces the likelihood of entrance of noise or the like into the individual signals by the fact that the processing is not needed.

Alternatively, the image determination unit 550 may have determination result holding means that holds determination results. By having the determination result holding means, the image determination unit 550 performs not only local-area-based image determination, but also entire-image-based image determination. Here, the determination result holding means of the image determination unit 550 may be, e.g., a volatile memory such as an SDRAM (Synchronous Dynamic Random Access Memory) or an SRAM (Static Random Access Memory), but is not limited to the above. For example, the determination result holding means may also be, e.g., a nonvolatile memory such as a flash memory.

Modified Example of Image Determination Apparatus According to Fifth Embodiment

The image type determination section (image determination apparatus) 500 according to the fifth embodiment is not limited to the above. If the image determination apparatus according to the fifth embodiment is configured, e.g., such that a plurality of configurations shown in FIG. 10 are arranged in parallel, the image type determination section 500 according to the fifth embodiment of the image type determination section determines images corresponding to a plurality of local areas simultaneously.

Furthermore, while FIG. 10 shows a configuration similar to that of the image type determination section 100 according to the first embodiment of the image type determination section, the image type determination section (image determination apparatus) 500 according to the fifth embodiment is not limited to the above, but may have a configuration similar to that of the image type determination section 200 according to the second embodiment of the image type determination section, or of the image type determination section 300 according to the third embodiment of the image type determination section. Therefore, the image type determination section 500 according to the fifth embodiment of the image type determination section performs image determination by calculating one or a plurality of relative values according to its configuration.

As described above, the image type determination section 500 according to the fifth embodiment of the image type determination section performs image determination, by utilizing frequency-amplitude characteristic differences between an HD-resolution image and a pseudo HD-resolution image such as shown in FIG. 2, based on the relative value of the average value of amplitude characteristic values in the intermediate frequency band to the average value of amplitude characteristic values in the low frequency band.

Furthermore, the image type determination section 500 according to the fifth embodiment of the image type determination section processes an image signal corresponding to one local area throughout a period from when the image type determination section 500 detects signals belonging to frequency bands to when it determines an image represented by the image signal, and thus the image type determination section 500 determines the image of a local area using only the frequency-amplitude characteristics of the image of the local area. Therefore, the image type determination section (image determination apparatus) 500 needs no processing for separating an image signal representing the entire image into signals respectively representing images of local areas, and thus reduces the likelihood of entrance of noise or the like into the individual signals. Consequently, the image type determination section 500 performs accurate image determination.

Therefore, the image type determination section 500 according to the fifth embodiment of the image type determination section does not require that side panels be added during upconversion of an SD-resolution image as in the related-art image type determination units, and thus determines an image independently of any method by which the image is upconverted.

Furthermore, the image type determination section (image determination apparatus) 500 is supplied with local-area-based input image signals and performs image determination every local area. Hence, the image type determination unit 500 performs image determination accurately even on an image in which an HD-resolution image and a pseudo HD-resolution image are mixed.

[Program for Image Determination]

With a program for causing the above-described image determination apparatus 500 according to the fifth embodiment of the present invention to function as a computer, the image determination apparatus 500 determines an image independently of any method by which the image is upconverted. Furthermore, the image determination apparatus 500 performs image determination accurately even on an image in which an HD-resolution image and a pseudo HD-resolution image are mixed.

Sixth Embodiment of Image Type Determination Unit (Image Determination Apparatus)

Figure 11:
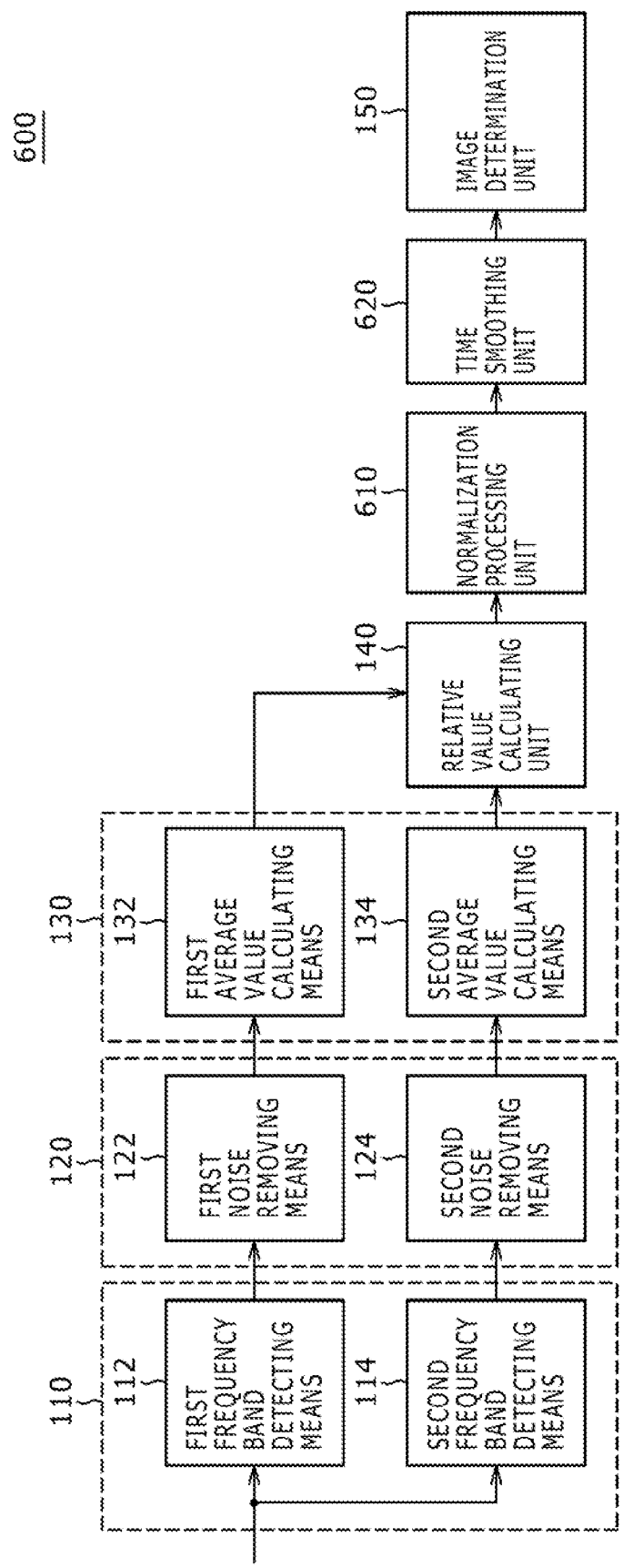
FIG. 11 is a diagram illustrating an image type determination unit according to a sixth embodiment of the image type determination unit.

For example, even when a scene for display remains the same, a television receiver displays the scene by rewriting images sequentially at a frame rate such as 30 frames/second according to the NTSC (National Television Standards Committee) standard. For this reason, it is not preferable that relative values largely fluctuate for the same scene, i.e., that determination results on the images for the same scene largely differ. Therefore, next, a sixth embodiment of the image type determination section according to the present invention will be described, which suppresses large fluctuation of image determination results during a predetermined period. FIG. 11 is a diagram illustrating an image type determination section 600 according to the sixth embodiment of the image type determination section.

Referring to FIG. 11, the image type determination section 600 according to the sixth embodiment of the image type determination section further has a normalization processing unit 610 and a time smoothing unit 620, in addition to the configuration of the image type determination unit 100 according to the first embodiment of the image type determination section.

Also, the image determination apparatus 600 may have, similarly to the image determination apparatus 100 according to the first embodiment, e.g., a control unit, not shown, configured with an MPU or the like, a ROM, not shown, a RAM, not shown, a storage unit, not shown, a receiving unit, not shown, an operation unit, not shown, and the like.

The frequency band signal detecting unit 110, noise removing unit 120, average value calculating unit 130, and relative value calculating unit 140 have functions similar to those of the image type determination section (image type determination apparatus) 100 according to the first embodiment of the image type determination section. A relative value used for image determination is outputted from the relative value calculating unit 140.

The normalization processing unit 610 normalizes the relative value calculated by the relative value calculating unit 140, and thus corrects the relative value calculated by the relative value calculating unit 140 to a relative value normalized within $0 \leq$ relative value $\leq 1$. Also, the normalization processing unit 610 does not perform the normalization processing if the relative value calculated by the relative value calculating unit 140 need not be normalized. Here, the normalization by the normalization processing unit 610 may be performed, e.g., by correcting a relative value calculated by the relative value calculating unit 140 to 1, if the relative value is not less than 1. The normalization method is not limited to the above.

The time smoothing unit 620 smooths the relative value outputted from the normalization processing unit 610. The smoothing by the time smoothing unit 620 is performed, e.g., so as to satisfy a relationship indicated by the following Equation 3.

$$Y_m = (1-\alpha)X_m + \alpha Y_{m-1} \quad \text{(Equation. 3)}$$

In Equation 3, Ym (m is an integer not less than 2) denotes the smoothed relative value outputted from the time smoothing unit 620. Furthermore, Xm is the relative value outputted from the normalization processing unit 610, and $Y_{m-1}$ is a relative value previously outputted from the time smoothing unit 620. Furthermore, $\alpha$ ($0<\alpha<1$) is a weighting coefficient. By presetting $\alpha$, the smoothing capability of the time smoothing unit 620 may be defined.

Here, the weighting coefficient $\alpha$ may be held in storage means by providing the storage means, e.g., in the time smoothing unit 620. The storage means of the time smoothing unit 620 includes, e.g., a nonvolatile memory such as an EEPROM or a flash memory, but is not limited to the above. Note that the weighting coefficient $\alpha$ may, of course, be stored, e.g., in the storage unit, not shown, of the image determination apparatus 600 and read from that storage means, not shown, by the time smoothing unit 620. Furthermore, the weighting coefficient $\alpha$ may be, e.g., a preset fixed value, but is not limited to the above. For example, the weighting coefficient $\alpha$ may be suitably changeable according to a user input from the operation unit, not shown, of the image determination apparatus 600.

Furthermore, the time smoothing unit 620 may be configured with a low-pass filter or the like, but is not limited to this configuration.

The image determination unit 150 performs image determination based on the smoothed relative value outputted from the time smoothing unit 620, similarly to the image determination apparatus 100 according to the first embodiment.

Modified Example of Image Determination Apparatus (Image Type Determination Section) According to Sixth Embodiment FIG. 11 shows a configuration similar to that of the image type determination section 100 according to the first embodiment of the image type determination section, as the sixth embodiment of the present invention. However, the image determination section 600 according to the sixth embodiment is not limited to the above configuration shown in FIG. 11. For example, the image determination section 600 may also have a configuration similar to that of the second to fifth embodiments of the image type determination unit according to the present invention. Therefore, the image type determination section 600 according to the sixth embodiment of the image type determination section performs image determination by calculating one or a plurality of relative values according to its configuration, and smoothing the calculated relative value(s).

As described above, the image type determination section 600 according to the sixth embodiment of the image type determination section performs image determination, by utilizing frequency-amplitude characteristic differences between an HD-resolution image and a pseudo HD-resolution image such as shown in FIG. 2, based on the relative value of the average value of amplitude characteristic values in the intermediate frequency band to the average value of amplitude characteristic values in the low frequency band.

The image type determination section 600 according to the sixth embodiment of the image type determination unit normalizes a relative value, and smooth the relative value based on a preset weighting coefficient $\alpha$, and thus may control fluctuation of relative values.

Therefore, the image type determination section 600 according to the sixth embodiment of the image type determination section does not require that side panels be added during upconversion of an SD-resolution image as in the related-art image type determination units, and thus determines an image independently of any method by which the image is upconverted.

The image type determination section 600 according to the sixth embodiment of the image type determination section performs time smoothing on calculated relative values, whereby the image type determination section 600 suppresses large fluctuation of determination results on images during a predetermined period, and thus performs accurate image determination. Therefore, the image processing unit 1300 performs processing such as the enhance processing on the images uniformly during a predetermined period.

[Program for Image Determination]

With a program for causing the above-described image type determination section (image determination apparatus) 600 according to the sixth embodiment of the present invention to function as a computer, the image determination apparatus 600 determines an image independently of any method by which the image is upconverted. Also, the image determination apparatus 600 may suppress large fluctuation of image determination results during a predetermined period.

Seventh Embodiment

In the above-described image determination apparatuses according to the first to sixth embodiments, the configurations in which the image determination apparatuses perform image determination based on input image signal(s). However, depending on an input image signal, there may be some cases where the determination result on the image based on the input image signal is inappropriate (the confidence level of the determination result is low). In view of this, as a seventh embodiment of the present invention, an image determination apparatus will be described next, which is capable of enhancing confidence levels in determination of an image.

Factors Responsible for Decreasing Confidence Levels Which Image Determination Apparatus According to Seventh Embodiment is to Cope with First, factors responsible for decreasing confidence levels will be described which the image determination apparatus according to the seventh embodiment is to cope with. The image determination apparatus according to the seventh embodiment considers the following items (1), (2) as major factors responsible for decreasing the confidence level of an image determination result.

(1) Sample Size of Amplitude Characteristic Values

The image determination apparatuses according to the embodiments of the present invention perform image determination by using, e.g., the HD level (relative value) indicated in Equation 1. However, the smaller the number of samples for calculating the average values indicated in Equation 1, the lower the statistical confidence levels of the average values. Therefore, if an HD level is calculated using average values whose statistical confidence levels are low, the image determination apparatuses may not always determine whether the image represented by an input image signal is an HD-resolution image or a pseudo HD-resolution image accurately.

(2) Average Value of Amplitude Characteristic Values

As mentioned above, the image determination apparatuses according to the embodiments of the present invention perform image determination by using, e.g., the HD level (relative value) indicated in Equation 1. However, if the average values indicated in Equation 1 are very small values, due to the influence of, e.g., noise (e.g., noise left unremoved by the noise removing unit of each image determination apparatus) becoming large, the confidence levels of the average values could be decreased. Therefore, if an HD level is calculated using average values whose confidence levels are low, the image determination apparatuses may not always determine whether the image represented by an input image signal is an HD-resolution image or a pseudo HD-resolution image accurately.

The image determination apparatus according to the seventh embodiment intends to improve confidence levels in image determination by eliminating the factors responsible for decreasing the confidence levels such as indicated in (1), (2) above.

Figure 12:
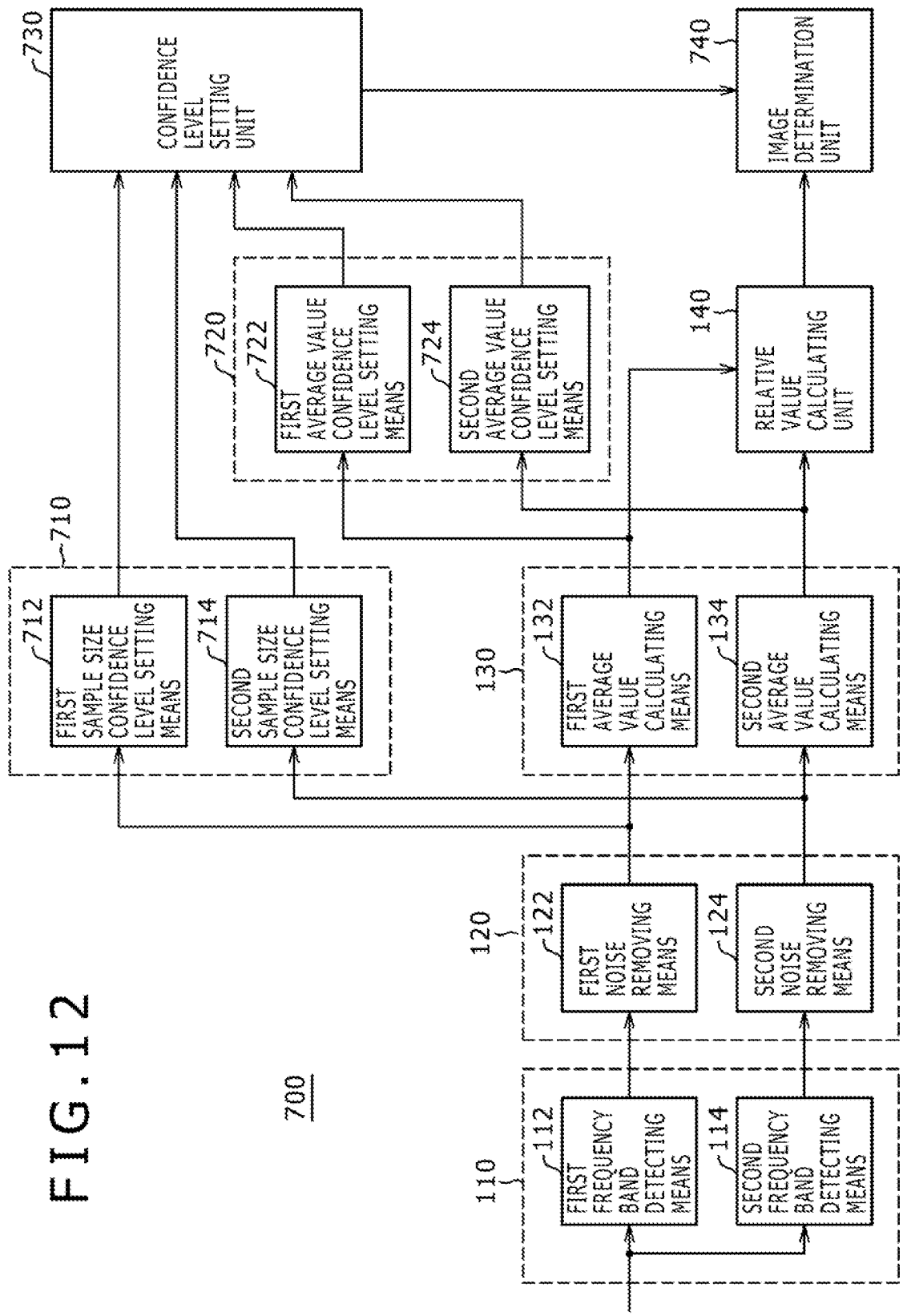
FIG. 12 is a diagram illustrating an image determination apparatus according to a seventh embodiment of the present invention.

Configuration Example of Image Determination Apparatus According to Seventh Embodiment Next, the image determination apparatus (image type determination section) according to the seventh embodiment of the present invention will be described. FIG. 12 is a diagram illustrating an image determination apparatus 700 according to the seventh embodiment of the present invention.

Referring to FIG. 12, the image determination apparatus 700 according to the seventh embodiment of the present invention further has a sample size confidence level setting unit 710, an average value confidence level setting unit 720, and a confidence level setting unit 730, in addition to the configuration of the image determination apparatus 100 according to the first embodiment of the present invention.

The image determination apparatus 700 may have, similarly to the image determination apparatus 100 according to the first embodiment, e.g., a control unit, not shown, configured with an MPU or the like, a ROM, not shown, a RAM, not shown, a storage unit, not shown, a receiving unit, not shown, an operation unit, not shown, and the like.

The frequency band signal detecting unit 110, noise removing unit 120, average value calculating unit 130, and relative value calculating unit 140 have functions similar to those of the image determination apparatus 100 according to the first embodiment. From the relative value calculating unit 140, a relative value used for image determination is outputted.

The sample size confidence level setting unit 710 corresponds to the above factor (1), and sets first confidence levels based on the number of pixels (sample size) whose amplitude characteristic values are non-0 (zero). More specifically, the sample size confidence level setting unit 710 has first sample size confidence level setting means 712 that sets a first confidence level based on an image signal outputted from the first noise removing means 122, and second sample size confidence level setting means 714 that sets a first confidence level based on an image signal outputted from the second noise removing means 124.

Here, the setting of the first confidence level in each of the first sample size confidence level setting means 712 and the second sample size confidence level setting means 714 may be performed according to, e.g., the following procedures (a), (b). Furthermore, while in the following, the setting of the first confidence level in the first sample size confidence level setting means 712 is shown as an example, the second sample size confidence level setting means 714 may similarly set its first confidence level.

[One exemplary procedure for setting first confidence level]

(a) Calculation of sample size

The first sample size confidence level setting means 712 calculates the sample size by determination whether an amplitude characteristic value is non-0 (zero) or not for each pixel. Here, in one method for calculating the sample size, e.g., a sizer value is incremented by 1 every time an amplitude characteristic value is determined as non-0(zero). However, the method is not limited to the above.

(b) Setting of First Confidence Level

The first sample size confidence level setting means 712 sets the first confidence level based on the calculated sample size. Here, the first sample size confidence level setting means 712 may set the first confidence level, e.g., by comparing the calculated sample size with a predetermined threshold. For example, if the calculated sample size is not less than the predetermined threshold, the first sample size confidence level setting means 712 may set the first confidence level to "1" (i.e., that sample size is a value usable for calculating the average value indicated in Equation 1), whereas if the calculated sample size is less than the predetermined threshold, the first sample size confidence level setting means 712 may set the first confidence level to "0" (i.e., that sample size is a value unusable for calculating the average value indicated in Equation 1). The predetermined threshold used for setting the first confidence level may be, e.g., a predefined fixed value, but is not limited to the above. The threshold may alternatively be a value varied according to a user input. The method for setting the first confidence level is not limited to the above.

The predetermined threshold used for setting the first confidence level by the first sample size confidence level setting means 712 may be held in storage means, e.g., by providing the storage means in the sample size confidence level setting unit 710 (or by providing the storage means in the first sample size confidence level setting means 712). Here, the storage means of the sample size confidence level setting unit 710 includes, e.g., a nonvolatile memory such as an EEPROM or a flash memory, but is not limited to the above. Note that the predetermined threshold used for setting the first confidence level may, of course, be stored, e.g., in the storage unit, not shown, of the image determination apparatus 700, and suitably read from that storage unit by the first sample size confidence level setting means 712.

The sample size confidence level setting unit 710 may set the first confidence levels, e.g., by the above procedures (a), (b).

The average value confidence level setting unit 720 corresponds to the above-mentioned factor (2), and sets second confidence levels based on average values calculated by the average value calculating unit 130. More specifically, the average value confidence level setting unit 720 has first average value confidence level setting means 722 that sets a second confidence level based on the average value outputted from the first average value calculating means 132, and second average value confidence level setting means 724 that sets a second confidence level based on the average value outputted from the second average value calculating means 134.

The setting of the second confidence level in each of the first average value confidence level setting means 722 and the second average value confidence level setting means 724 may be performed, e.g., as indicated below. Furthermore, while in the following, the setting of the second confidence level in the first average value confidence level setting means 722 is shown as an example, the second average value confidence level setting means 724 may set its second confidence level similarly.

[One Exemplary Procedure for Setting Second Confidence Level]

The first average value confidence level setting means 722 sets the second confidence level, e.g., by comparing the average value outputted from the first average value calculating means 132 with a predetermined threshold. For example, if the average value outputted from the first average value calculating means 132 is not less than the predetermined threshold, the first average value confidence level setting means 722 sets the second confidence level to "1" (i.e., that average value is a value usable for calculating the HD level indicated in Equation 1), whereas if the average value outputted from the first average value calculating means 132 is less than the predetermined threshold, the first average value confidence level setting means 722 may set the second confidence level to "0" (i.e., that average value is a value unusable for calculating the HD level indicated in Equation 1). The predetermined threshold used for setting the second confidence level may be, e.g., a predefined fixed value. However, the predetermined threshold is not limited to the above, but may be a value varied according to a user input. The method for setting the second confidence level is not limited to the above.

Furthermore, the predetermined threshold used for setting the second confidence level by the first average value confidence level setting means 722 may be held in storage means, e.g., by providing the storage means in the average value confidence level setting unit 720 (or by providing the storage means in the first average value confidence level setting means 722). Here, the storage means of the average value confidence level setting unit 720 includes, e.g., a nonvolatile memory such as an EEPROM or a flash memory, but is not limited to the above. The predetermined threshold used for setting the second confidence level may be stored, e.g., in the storage unit, not shown, of the image determination apparatus 700, and suitably read from that storage unit by the first average value confidence level setting means 722.

The average value confidence level setting unit 720 sets the second confidence levels, e.g., by the above-mentioned procedure.

The confidence level setting unit 730 sets a third confidence level being a confidence level for the relative value calculated by the relative value calculating unit 140, i.e., for the HD level in Equation 1, based on the first confidence levels outputted from the sample size confidence level setting unit 710 and the second confidence levels outputted from the average value confidence level setting unit 720.

[One Exemplary Procedure for Setting Third Confidence Level]

The confidence level setting unit 730 sets the third confidence level based on the first confidence level (first first confidence level) set by the first sample size confidence level setting means 712, the first confidence level (second first confidence level) set by the second sample size confidence level setting means 714, the second confidence level (first second confidence level) set by the first average value confidence level setting means 722, and the second confidence level (second second confidence level) set by the second average value confidence level setting means 724.

For example, if all the first first confidence level, second first confidence level, first second confidence level, and second second confidence level are "1", the confidence level setting unit 730 may set the third confidence level to "1" (i.e., that relative value calculated by the relative value calculating unit 140 is a value usable for image determination). Conversely, e.g., if any of the first first confidence level, second first confidence level, first second confidence level, and second second confidence level is "0", the confidence level setting unit 730 may set the third confidence level to "0" (i.e., that relative value calculated by the relative value calculating unit 140 is a value unusable for image determination). Note that the third confidence level setting criterion is not, of course, limited to the above.

The confidence level setting unit 730 sets the third confidence level, e.g., by a setting criterion such as mentioned above.

The image determination unit 740 performs image determination as indicated in, e.g., the below-described cases (A), (B), based on the relative value calculated by the relative value calculating unit 140 and the third confidence level set in the confidence level setting unit 730.

[Image Determination in Image Determination Unit 740]
(A) If Third Confidence Level is "1"

If the third confidence level is "1", the image determination unit 740 performs image determination by using the relative value calculated by the relative value calculating unit 140, similarly to the image determination apparatus 100 according to the first embodiment. Also, the image determination unit 740 records the relative value used for image determination. The image determination unit 740 may record the relative value in, e.g., storage means provided in the image determination unit 740. However, the storage means is not limited to the above. The relative value may be recorded in the storage unit, not shown, provided in the image determination apparatus 700. The storage means provided in the image determination unit 740 includes, e.g., a nonvolatile memory such as an EEPROM or a flash memory. However, the storage means is not limited to the above, but may be, e.g., a volatile memory such as an SRAM.

(B) If Third Confidence Level is "0"

If the third confidence level is "0", the image determination unit 740 performs image determination by using a relative value used in a previous image determination that was performed normally. Here, the image determination unit 740 may read the relative value, e.g., from its storage means or from the storage unit, not shown, of the image determination apparatus 700. If the image determination unit 740 does not read the relative value, the image determination unit 740 outputs, e.g., a predefined image determination result. However, the processing in this case is not limited to the above, but, e.g., no processing may be performed.

The image determination unit 740 performs image determination as indicated in, e.g., the above cases (A), (B).

Modified Example of Image Determination Apparatus According to Seventh Embodiment FIG. 12 shows a configuration in which the image determination apparatus has the first average value confidence level setting means 722 and the second average value confidence level setting means 724 as the average value confidence level setting unit 720. However, the configuration of the image determination apparatus according to the seventh embodiment is not limited to the configuration shown in FIG. 12. For example, the image determination apparatus according to the seventh embodiment may be configured to have only the first average value confidence level setting means as the average value confidence level setting unit. The HD level indicated in Equation 1 fluctuates largely, particularly depending on the value of the denominator. Therefore, the image determination apparatus according to the seventh embodiment checks at least the confidence level of the average value of amplitude characteristic values equivalent to the value of the denominator in Equation 1, whereby the image determination apparatus performs image determination after eliminating the factor responsible for decreasing the confidence level of an image determination result indicated in (2) above.

In FIG. 12, the configuration similar to that of the image determination apparatus 100 according to the first embodiment of the present invention is disclosed as the image determination apparatus according to the seventh embodiment of the present invention. However, the configuration of the image determination apparatus according to the seventh embodiment is not limited to the configuration shown in FIG. 12. For example, the image determination apparatus according to the seventh embodiment may have a configuration similar to any of the image determination apparatuses according to the second to sixth embodiments of the present invention. Therefore, the image determination apparatus according to the seventh embodiment of the present invention may perform image determination by calculating one or a plurality of relative values according to its configuration.

As described above, the image determination apparatus 700 according to the seventh embodiment of the present invention performs image determination, by utilizing frequency-amplitude characteristic differences between an HD-resolution image and a pseudo HD-resolution image such as shown in FIG. 2, based on the relative value of the average value of amplitude characteristic values in the intermediate frequency band to the average value of amplitude characteristic values in the low frequency band.

Consequently, the image determination apparatus 700 according to the seventh embodiment of the present invention does not require that side panels be added during upconversion of an SD-resolution image as in the related-art image type determination units, and thus may more strictly determine an image independently of any method by which the image is upconverted.

Moreover, the image determination apparatus 700 according to the seventh embodiment of the present invention sets the third confidence level for the relative value based on the first confidence levels for the sample sizes of amplitude characteristic values and the second confidence levels for the average values of the amplitude characteristic values. Then, the image determination apparatus 700 performs image determination based on the set third confidence level and the relative value.

Therefore, the image determination apparatus 700 performs image determination after eliminating the factors responsible for decreasing the confidence levels of an image determination result, namely, (1) the sample sizes of amplitude characteristic values and (2) the average values of the amplitude characteristic values. Consequently, the image determination apparatus 700 enhances the confidence level in image determination.

[Program for Image Determination]

With a program for causing the above-described image determination apparatus 700 according to the seventh embodiment of the present invention to function as a computer, the image determination apparatus 700 determines an image independently of any method by which the image is upconverted, and also, after eliminating the factors responsible for decreasing the confidence levels of an image determination result.

The image determination apparatuses have been described above as the first to seventh embodiments of the present invention. The first to seventh embodiments of the present invention are not limited thereto, but may be applicable to display apparatuses such as a television receiver, an OELD (Organic ElectroLuminescence Display), an FED (Field Emission Display), or a PDP (Plasma Display Panel), or a computer such as a PDA (Personal Digital Assistant), an UMPC (Ultra Mobile Personal Computer), or a portable communication device such as a portable telephone or a PHS (Personal Handyphone System), or the like.

[Second Image Determination Method]

Figure 13:
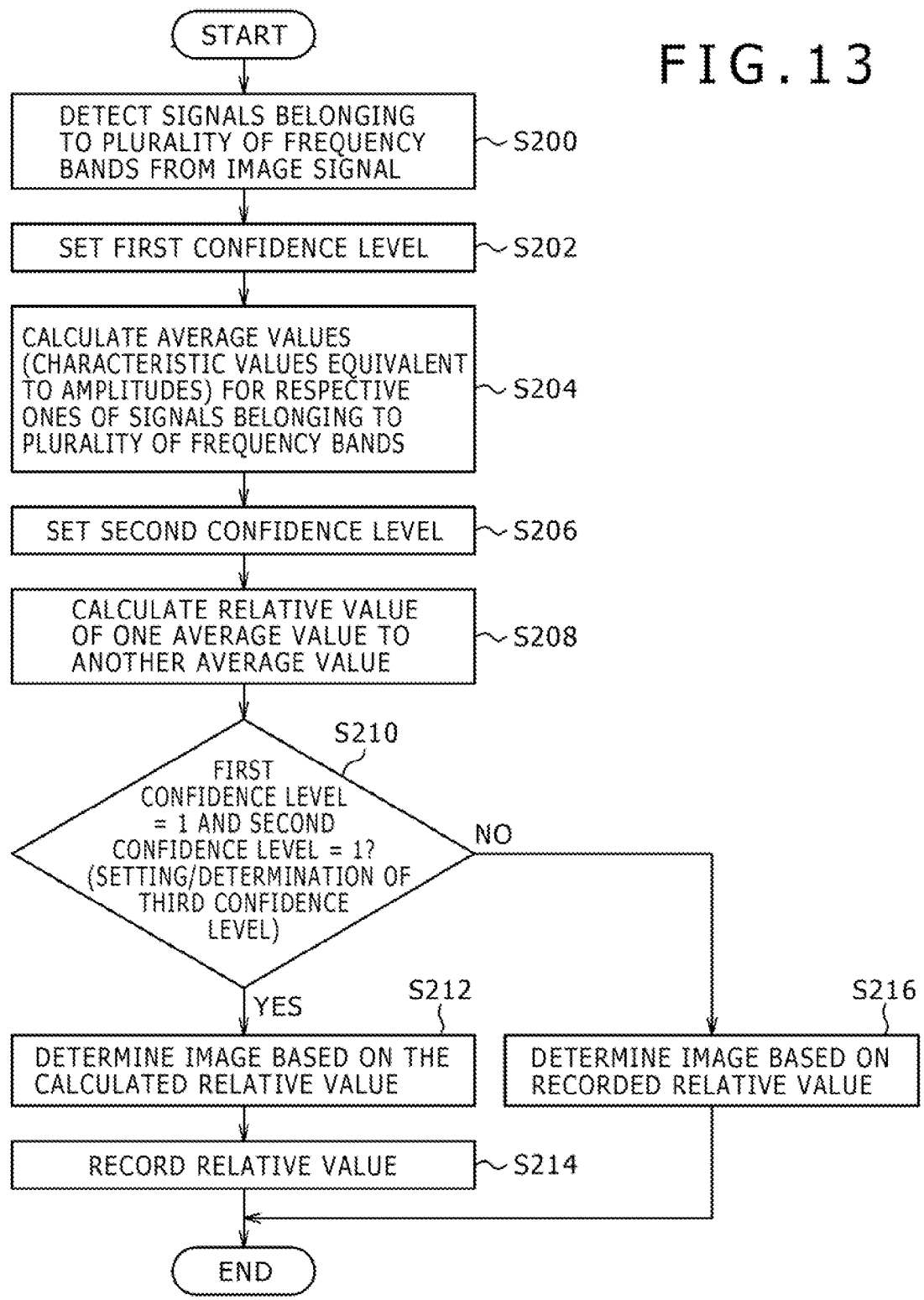
FIG. 13 is a flow diagram showing a second image determination method according to an embodiment of the present invention.

Next, a second image determination method according to an embodiment of the present invention will be described. FIG. 13 is a flow diagram showing an example of the second image determination method according to the embodiment of the present invention.

First, the image determination apparatus detects signals belonging to a plurality of frequency bands from an input image signal, similarly to the first image determination method (S200). In this step, the detection of the signals may be performed every pixel.

The image determination apparatus sets first confidence levels, for respective ones of the signals belonging to the plurality of frequency bands detected in step S200 (S202). The setting of a first confidence level in step S202 may be performed, e.g., by comparing the number of pixels (sample size) whose amplitude characteristic values are non-0 (zero) with a predetermined threshold.

The image determination apparatus calculates average values of amplitude characteristic values, for respective ones of the signals belonging to the plurality of frequency bands detected every pixel in step S200 (S204). In this step, the amplitude characteristic value may be an amplitude value itself or may be its power spectrum. Furthermore, the average value calculating method is not limited to arithmetic mean, but various other calculating methods including, e.g., geometric mean or weighted mean may be used.

The image determination apparatus sets second confidence levels based on the average values calculated for respective ones of the signals belonging to the plurality of frequency bands in step S204 (S206). In this step, the setting of a second confidence level in step S206 may be performed, e.g., by comparing the average value with a predetermined threshold.

The image determination apparatus calculates, among the average values calculated for respective ones of the signals belonging to the plurality of frequency bands in step S204, a relative value to one average value of another average value, similarly to the first image determination method (S208). Here, the relative value may be obtained, e.g., by dividing such another average value by such one average value or may alternatively be obtained by subtracting such one average value in logarithmic form from such another average value in logarithmic form.

The image determination apparatus determines whether or not "first confidence level=1" and "second confidence level=1" based on the first confidence levels set in step S202 and the second confidence levels set in step S206 (S210: setting of third confidence level/determination).

If it is determined in step S210 that "first confidence level=1" and "second confidence level=1", the image determination apparatus determines the image based on the relative value calculated in step S208 similarly to the first image determination method (S212). Then, the image determination apparatus records the relative value used for the determination on the image in step S212 (S214).

Meanwhile, if it is determined in step S210 that either "first confidence level=1" or "second confidence level=1" or neither "first confidence level=1" nor "second confidence level=1", the image determination apparatus determines the image based on a recorded relative value (S216). Here, the relative value used for the determination in step S216 may be, e.g., the relative value recorded in step S214, but is not limited to the above.

As indicated in the above-mentioned steps S200 to S216, the second image determination method according to the embodiment of the present invention performs image determination, by utilizing frequency-amplitude characteristic differences between an HD-resolution image and a pseudo HD-resolution image such as shown in FIG. 2, based on the relative value of the average value of amplitude characteristic values in the intermediate frequency band to the average value of amplitude characteristic values in the low frequency band.

The second image determination method may set the third confidence level for the relative value based on the first confidence levels for the sample sizes of amplitude characteristic values and the second confidence levels for the average values of the amplitude characteristic values. Then, the second image determination method may perform image determination based on the set third confidence level and the relative value.

As described above, the second image determination method according to the embodiment of the present invention does not require that side panels be added during upconversion of an SD-resolution image as in the related-art image type determination units, and thus may determine an image independently of any method by which the image is upconverted, and also, after eliminating the factors responsible for decreasing the confidence levels of an image determination result.

[Application Example of Image Determination Apparatus]

Next, an application example of the image determination apparatuses according to the embodiments of the present invention will be described. FIG. 14 is a diagram illustrating a display apparatus 1000 to which the image determination apparatuses according to the embodiments of the present invention is applied. In the following, as an application example of the image determination apparatuses according to the embodiments of the present invention, a display apparatus such as an OELD or an FED will be described. Note that the image determination apparatuses according to the embodiments of the present invention are applicable not limited to a display apparatus, but, of course, to, e.g., a computer such as a PC (Personal Computer) or a server, or a portable communication device such as a portable telephone.

Referring to FIG. 14, the display apparatus 1000 includes an image signal receiving section 1100, an image type determination section 1200, an image processing section 1300, and a display section 1400.

The display apparatus 1000 may also have, e.g., a control unit, not shown, that is configured with an MPU (Micro Processing Unit) and controls the whole display apparatus 1000, a ROM (Read Only Memory), not shown, in which programs and control data, such as operation parameters, used by the control unit are recorded, a RAM (Random Access Memory), not shown, that temporarily stores a program executed by the control unit, and the like, a display apparatus storage unit, not shown, that may store images to be processed by the image processing unit 1300, and the like, an operation unit, not shown, that a user operates, and the like. The display apparatus 1000 interconnects the above components via a bus as a data transmission path. Here, the display apparatus storage unit, not shown, includes, e.g., a magnetic recording medium such as a hard disk and a nonvolatile memory such as a flash memory, but is not limited to the above. Furthermore, the operation unit, not shown, also includes, e.g., operation input devices, such as a keyboard, a mouse, buttons, direction keys, or their combinations, but is not limited to the above.

The image signal receiving section 1100 receives, e.g., an image signal transmitted from a broadcasting station or the like. Note that the image signal received by the image signal receiving section is not limited to the above, but may be, e.g., an image signal transmitted from an external apparatus via a network such as a LAN (Local Area Network), or an image signal read by the display apparatus 1000 from an image file stored in the display apparatus storage unit, not shown. Furthermore, the image signal received by the image signal receiving section 1100 may represent a still image or a motion picture (so-called video).

The image type determination section 1200 is a component corresponding to the image determination apparatuses according to the embodiments of the present invention, and determines, based on an input image signal, whether the image represented by the image signal is an HD-resolution image or a pseudo HD-resolution image.

Configuration Example of Image Type Determination Section 1200

The image type determination section 1200 includes, e.g., an image type determination value calculating unit 1210, a determination value confidence level setting unit 1220, and an image determination unit 1230.

The image type determination value calculating unit 1210 may calculate an image type determination value for determination an image. The image type determination value calculating unit 1210 corresponds to, e.g., the frequency band signal detecting unit 110, noise removing unit 120, average value calculating unit 130, and relative value calculating unit 140 shown in FIG. 12. Therefore, the image type determination value calculating unit 1210 may calculate a relative value (HD level indicated in Equation 1) of the average value of amplitude characteristic values in the intermediate frequency band to the average value of amplitude characteristic values in the low frequency band, as the image type determination value.

The determination value confidence level setting unit 1220 may set a confidence level for the image type determination value. The determination value confidence level setting unit 1220 corresponds to, e.g., the sample size confidence level setting unit 710, average value confidence level setting unit 720, and confidence level setting unit 730 shown in FIG. 12. Therefore, the determination value confidence level setting unit 1220 may set a confidence level for the relative value (HD level indicated in Equation 1).

The image determination unit 1230 performs image determination based on the image type determination value (relative value) calculated by the image type determination value calculating unit 1210 and the confidence level for the image type determination value. Here, the image determination unit 1230 may perform image determination similarly to, e.g., the image determination unit 740 shown in FIG. 12.

With a configuration such as above, the image type determination unit 1200 may determine, based on an input image signal, whether or not the image represented by an image signal is an HD-resolution image or a pseudo HD-resolution image. FIG. 14 shows a configuration corresponding to the image determination apparatus according to the seventh embodiment shown in FIG. 12 as the image type determination unit 1200. However, the image type determination unit 1200 is not limited to the configuration shown in FIG. 14.

The image processing section 1300 performs processing on the image based on a determination result on the image in the image type determination section 1200. The image processing unit 1300 performs the image processing based on binary determination results. For example, if the image is determined as a pseudo HD-resolution image, the image processing section 1300 performs processing on the image using a predetermined parameter, whereas if the image is determined as an HD-resolution image, the image processing unit 1300 performs no processing on the image.

The image processing unit 1300 may suitably select a parameter for processing based on the relative value (HD level in Equation 1) calculated by the image type determination section 1200, and change its processing according to the selected parameter. Here, the selection of the parameter may be realized, e.g., by providing the image processing section 1300 with a parameter selecting unit, not shown, for selecting a parameter. The parameter selecting unit, not shown, may select a parameter according to the relative value calculated by the image type determination section 1200, by using, e.g., a look-up table in which relative values are associated with parameters, but is not limited to the above. The parameter selecting means is not limited to the above. For example, the image processing apparatus 1000 may have the parameter selecting unit, not shown, independent of the image processing section 1300.

Furthermore, the image processing section 1300 may also perform various processing such as, e.g., processing for enhancing the outline of an image (hereinafter referred to as "enhance processing"), contrast processing, and noise reducing, based on a determination result on the image in the image type determination section 1200.

The display section 1400 displays the image based on the image signal processed by the image processing section 1300.

As shown in FIG. 14, the display apparatus 1000 determines an image based on an input image signal, and perform processing on the image based on a determination result on the image. Therefore, the display apparatus 1000 performs processing suitable for the input image signal, and thus displays the image of higher quality.

As described above, the apparatus to which the image determination apparatuses according to the embodiments of the present invention are applied determines an image based on an input image signal, and perform processing on the image based on a determination result on the image.

Although the embodiments have been described in its preferred form, it is understood that the present disclosure of the embodiments have been changed in the details of configuration and the combination and arrangement of parts may be resorted to without departing from the scope of the embodiments.

For example, while in the image determination apparatuses according to the above-described first to seventh embodiments of the present invention, the average value calculating unit for calculating average values is provided, the image determination apparatuses are not limited to this configuration. A media calculating unit for calculating medians may instead be provided. Even if the calculation of a relative value is performed by using medians, instead of average values, the image determination apparatuses may utilize frequency-amplitude characteristic differences between an HD-resolution image and a pseudo HD-resolution image such as shown in FIG. 2, and thus may perform image determination.

Furthermore, while a configuration is disclosed in which the image determination apparatuses according to the above-described first to fifth and seventh embodiments of the present invention do not have the normalization processing unit 610 according to the above-described sixth embodiment of the present invention, the image determination apparatuses are not limited to this configuration. The image determination apparatuses according to the above-described first to fifth embodiments of the present invention may have the normalization processing unit. As mentioned earlier, the normalization processing unit corrects the relative value to a relative value normalized within $0 \leq$ relative value $\leq 1$. Therefore, the image type determination apparatuses having the normalization processing unit may perform image processing by using frequency-amplitude characteristic differences between an HD-resolution image and a pseudo HD-resolution image such as shown in FIG. 2.

Still furthermore, a configuration is disclosed in which the image determination apparatuses according to the above-described first to seventh embodiments of the present invention have the noise removing unit. However, the image determination apparatuses are not limited to this configuration, but may be configured to have no noise removing unit. As described above, the image determination apparatuses according to the embodiments of the present invention perform image determination by utilizing frequency-amplitude characteristic differences between an HD-resolution image and a pseudo HD-resolution image such as shown in FIG. 2. Therefore, even if affected by noise, the image determination apparatuses may determine an image independently of any method by which the image is upconverted.

The above-disclosed first to fifth, and seventh embodiments of the image type determination section according to the present invention use frequency-amplitude characteristic differences between an HD-resolution image and a pseudo HD-resolution image, whereby they may determine an image accurately independently of any method by which the image is upconverted. Therefore, the image processing apparatus 1000 according to the first embodiment of the present invention having any of the above-described image type determination units may perform processing suitable for an image independently of any method by which the image is upconverted.

[Program for Image Processing]

With a program for causing the above-described image processing apparatus 1000 according to the first embodiment of the present invention to function as a computer, the image processing apparatus 1000 is enabled to determine an image independently of any method by which the image is upconverted, and perform processing suitable for the image.

Image Processing Apparatus According to One Embodiment of Present Invention

Next, an image processing apparatus according to an embodiment of the present invention will be described. FIG. 15 is a diagram illustrating an image processing apparatus 2000 according to one embodiment of the present invention.

Referring to FIG. 15, the image processing apparatus 2000 according to the embodiment of the present invention has a configuration and a function similar to those of the image processing apparatus 1000 according to the first embodiment of the present invention shown in FIG. 3. When compared with the image processing apparatus 1000, the image processing apparatus 2000 further has a scene change detecting section 2100, and an image type determination section 2200 thereof differs from the image type determination section 1200 according to the first embodiment.

The scene change detecting section 2100 detects a scene change in an image signal transmitted from a broadcasting station or the like, and outputs a scene change signal. Here, the term "scene change" means any change in the image represented by an image signal transmitted from a broadcasting station or the like, e.g., from a film to a CM (Commercial Message), or a change in the composition of the image. Particularly, when a film changes to a CM, switching between an HD-resolution image and a pseudo HD-resolution image may often occur. Therefore, it is preferable to detect a scene change and perform image processing suitable for each of different scenes in order to improve image quality.

The scene change detecting unit 2100 detects a scene change by processing an image signal and an audio signal transmitted together with the image signal from a broadcasting station or the like. Note that the scene change detecting method in the scene change detecting unit 2100 is not limited to the above, but may include a method using, e.g., an auxiliary information signal indicating a scene change. Furthermore, while the above scene change signal may be a digital signal, it is not limited thereto. The scene change signal may otherwise be an analog signal.

The image type determination section 2200 performs image determination for each scene based on a corresponding detection result from the scene change detecting section 2100. Next, the image type determination section 2200 will be described.

Eighth Embodiment of Image Type Determination Section (Image Determination Apparatus)

FIG. 16 is a diagram illustrating an image type determination section 800 according to an eighth embodiment of the image type determination section. Referring to FIG. 16, the image type determination section 800 according to the eighth embodiment of the image type determination section has a configuration and a function similar to those of the image type determination section 600 according to the sixth embodiment of the image type determination section shown in FIG. 11, and when compared with the image type determination unit 600, a time smoothing unit 810 thereof differs from the time smoothing unit 620 according to the image type determination unit 600.

The time smoothing unit 810 is supplied with a relative value normalized by the normalization processing unit 610 and a scene change signal outputted responsive to a scene change from the scene change detecting unit 2100. The time smoothing unit 810 newly starts its time smoothing processing upon supply of a scene change signal. That is, when one scene changes to another, the time smoothing unit 810 does not smooth relative values for both scenes continuously, but smooths a relative value for each scene. Therefore, the image determination unit 150 performs relative value-based image determination every scene, and thus performs image determination accurately unaffected by a scene change.

Furthermore, while FIG. 16 shows a configuration similar to that of the image type determination section 100 according to the first embodiment of the image type determination section (image determination apparatus), the image type determination section according to the eighth embodiment of the image type determination section is not limited to the above configuration, but may have a configuration similar to any of the second to fifth embodiments of the image type determination section according to the present invention. Therefore, the image type determination section 800 according to the eighth embodiment of the image type determination unit may perform image determination every scene by calculating one or a plurality of relative values according to its configuration, and smoothing the relative value(s).

As described above, the image type determination section 800 according to the eighth embodiment of the image type determination section performs image determination, by utilizing frequency-amplitude characteristic differences between an HD-resolution image and a pseudo HD-resolution image such as shown in FIG. 2, based on the relative value of the average value of amplitude characteristic values in the intermediate frequency band to the average value of amplitude characteristic values in the low frequency band.

Furthermore, the image type determination section 800 according to the eighth embodiment of the image type determination section normalizes a relative value, and smooths the relative value based on a preset weighting coefficient α, whereby the image type determination section 800 controls fluctuation of relative values, similarly to the image type determination section 600 according to the sixth embodiment of the image type determination section.

Therefore, the image type determination section 800 according to the eighth embodiment of the image type determination section does not require that side panels be added during upconversion of an SD-resolution image as in the related-art image type determination units, and thus determines an image independently of any method by which the image is upconverted.

Furthermore, the image type determination section 800 according to the eighth embodiment of the image type determination section performs time smoothing on a relative value calculated for each scene, whereby the image type determination unit 800 suppresses large fluctuation of determination results on images in the same scene, and thus performs accurate image determination scene by scene.

Consequently, the image processing apparatus 2000 according to the embodiment of the present invention having the image type determination section 800 according to the eighth embodiment of the image type determination section performs processing suitable for an image, independently of any method by which the image is upconverted and also responsive to a scene change even when the image switches between an HD-resolution image and a pseudo HD-resolution image.

[Program for Image Processing]

With a program for causing the above-described image processing apparatus 2000 according to the embodiment of the present invention to function as a computer, the image processing apparatus 2000 is enabled to determine an image independently of any method by which the image is upconverted, and perform processing suitable for the image for each scene.

Furthermore, the image processing apparatuses have been described as the embodiments of the present invention. However, the embodiments of the present invention are not limited thereto, but may be applicable to a television receiver, a computer such as a PDA (Personal Digital Assistant) or an UMPC (Ultra Mobile Personal Computer), a portable communication device such as a portable telephone or a PHS (Personal Handyphone System), and the like.

By applying the embodiments of the present invention to a television receiver, a computer, a portable communication device, and the like, e.g., if a high-vision broadcast and a one-segment broadcast are to be received, these apparatuses may perform processing suitable for received image signals, whereby their image quality is improved.

As this invention may be embodied in several embodiments without departing from the spirit of essential characteristics thereof, the present embodiments are therefore illustrative and not restrictive, since the scope of the invention is defined by the appended claims rather than the by the description preceding them, and all changes that fall within meets and bounds of the claims, or equivalence of such meets and bounds are therefore intended to embraced by the claims.

The present application claims benefit of priorities of Japanese Patent Applications No. 2006-232556 filed in the Japanese Patent Office on Aug. 29, 2006, No. 2006-232570 filed in the Japanese Patent Office on Aug. 29, 2006, and No. 2007-199435 filed in the Japanese Patent Office on Jul. 31, 2007, the entire contents of which being incorporated herein by reference.

What is claimed is:

1. An image determination apparatus comprising:
a frequency band signal detecting unit for detecting signals belonging to a plurality of frequency bands, from an image signal;
an average value calculating unit for calculating average values, each of which is a characteristic value equivalent to an amplitude, for respective ones of the signals belonging to the plurality of frequency bands detected by the frequency band signal detecting unit;
a relative value calculating unit for calculating a relative value of one of the average values to another of the average values, among the average values calculated for respective ones of the plurality of frequency bands; and
an image determination unit for determining an image based on the relative value calculated by the relative value calculating unit.

2. The image determination apparatus according to claim 1, further comprising:
a noise removing unit for removing signals indicating the characteristic value less than a predetermined threshold, for respective ones of the signals belonging to the plurality of frequency bands detected by the frequency band signal detecting unit, and
wherein the average value calculating unit calculates average value of the characteristic value from which noise is removed by the noise removing unit.

3. The image determination apparatus according to claim 1, further comprising:
a sample size confidence level setting unit for setting first confidence levels for respective ones of the signals belonging to the plurality of frequency bands detected by the frequency band signal detecting unit, each of the first confidence levels corresponding to a sample size of the characteristic values;
an average value confidence level setting unit for setting a second confidence level for at least one of the average values for the respective ones of the signals belonging to the plurality of frequency bands calculated by the average value calculating unit; and
a confidence level setting unit for setting a third confidence level corresponding to the relative value based on the first confidence levels and the second confidence level, and
wherein the image determination unit determines the image further based on the third confidence level.

4. The image determination apparatus according to claim 3, wherein the image determination unit determines the image based on the relative value calculated by the relative value calculating unit if the third confidence level is not less than a predetermined threshold.

5. The image determination apparatus according to claim 3, wherein the image determination unit records a relative value used to determine an image, and determines the image based on the recorded relative value if the third confidence level is less than a predetermined threshold.

6. The image determination apparatus according to claim 1, wherein the relative value calculating unit calculates the relative value based on the average value calculated with a preset predetermined frequency band and the average value calculated with a frequency band higher than the preset predetermined frequency band.

7. The image determination apparatus according to claim 6, wherein
a lower limit frequency of the preset predetermined frequency band is lower than an upper limit of theoretically effective frequencies pursuant to upconverting method with respect to a Nyquist frequency of an image upconverted from a standard-resolution image, and a lower limit frequency of the higher frequency band is higher than the upper limit of theoretically effective frequencies pursuant to upconverting method with respect to the Nyquist frequency of the image upconverted from the standard-resolution image.

8. The image determination apparatus according to claim 1, wherein the relative value calculating unit calculates a plurality of the relative values based on the average value calculated with a preset predetermined frequency band and the average values calculated with a plurality of frequency bands higher than the preset predetermined frequency band.

9. The image determination apparatus according to claim 1, wherein the relative value calculating unit calculates a plurality of the relative values based on the average values calculated with a plurality of preset predetermined frequency bands and the average value calculated with a frequency band higher than each of the plurality of preset predetermined frequency bands.

10. The image determination apparatus according to claim 1, wherein the average value calculating unit calculates the average value in each of the plurality of frequency bands, for each of local areas in the whole of an image, and the image determination unit determines the image for each of the local areas based on the relative value.

11. An image determination method comprising the steps of:
  detecting signals belonging to a plurality of frequency bands, from an image signal;
  calculating average values, each of which is a characteristic value equivalent to an amplitude, for respective ones of the detected signals belonging to the plurality of frequency bands;
  calculating a relative value of one of the average values to another of the average values, among the average values calculated for respective ones of the plurality of frequency bands; and
  determining an image based on the calculated relative value.

12. A non-transitory memory comprising a program for causing a computer to execute the steps of:
  detecting signals belonging to a plurality of frequency bands, from an image signal;
  calculating average values, each of which is a characteristic value equivalent to an amplitude, for respective ones of the signals belonging to the plurality of frequency bands detected in the detecting step;
  calculating a relative value of one of the average values to another of the average values, among the average values calculated for respective ones of the plurality of frequency bands; and
  determining an image based on the relative value calculated in the relative value calculating step.

13. An image processing apparatus comprising:
  an image type determination section including:
    a frequency band signal detecting unit for detecting signals belonging to a plurality of frequency bands, from an image signal,
    an average value calculating unit for calculating average values, each of which is a characteristic value equivalent to an amplitude, for respective ones of the signals belonging to the plurality of frequency bands detected by the frequency band signal detecting unit,
    a relative value calculating unit for calculating a relative value of one of the average values to another of the average values, among the average values calculated for respective ones of the plurality of frequency bands, and
    an image determination unit for determining an image based on the relative value calculated by the relative value calculating unit; and
  an image processing section for performing image based processing on the result of the image type determination section.

14. The image processing apparatus according to claim 13, wherein:
  the image type determination section further comprises a noise removing unit for removing signals indicating the characteristic value less than a predetermined threshold, for respective ones of the signals belonging to the plurality of frequency bands detected by the frequency band signal detecting unit, and
  wherein the average value calculating unit calculates average values of the characteristic values from which noise is removed by the noise removing unit.

15. The image processing apparatus according to claim 13, wherein the relative value calculating unit calculates the relative value based on the average value calculated with a preset predetermined frequency band and the average value calculated with a frequency band higher than the preset predetermined frequency band.

16. The image processing apparatus according to claim 13, wherein the relative value calculating unit calculates a plurality of the relative values based on the average values calculated with a preset predetermined frequency band and the average values calculated with a plurality of frequency bands higher than the preset predetermined frequency band.

17. The image processing apparatus according to claim 13, wherein the relative value calculating unit calculates a plurality of the relative values based on the average values calculated with a plurality of preset predetermined frequency bands and the average values calculated with a frequency band higher than each of the plurality of preset predetermined frequency bands.

18. The image processing apparatus according to claim 13, wherein the image type determination unit further comprises a time smoothing unit for performing time-smoothing of the relative value, and the image determination unit determines the image based on the time-smoothed relative value.

19. An image processing method comprising the steps of:
  detecting signals belonging to a plurality of frequency bands, from an image signal;
  calculating average values, each of which is a characteristic value to an amplitude, for respective ones of the detected signals belonging to the plurality of frequency bands;
  calculating a relative value of one of the average values to another of the average values, among the average values calculated for respective ones of the plurality of frequency bands;
  determining an image based on the calculated relative value; and
  performing an image processing based on the result of the image determination.

20. A non-transitory memory comprising a program for causing a computer to execute the steps of:
  detecting signals belonging to a plurality of frequency bands, from an image signal;
  calculating average values, each of which is a characteristic value equivalent to an amplitude, for respective ones of the detected signals belonging to the plurality of frequency bands;
  calculating a relative value of one of the average values to another of the average values, among the average values calculated for respective ones of the plurality of frequency bands;
  determining an image based on the calculated relative value; and
  performing an image processing based on the result of the image determination.

* * * * *